US012457309B2

(12) United States Patent
Samples et al.

(10) Patent No.: US 12,457,309 B2
(45) Date of Patent: *Oct. 28, 2025

(54) AMPLITUDE AND BIPHASE CONTROL OF MEMS SCANNING DEVICE

(71) Applicant: Microsoft Technology Licensing, LLC, Redmond, WA (US)

(72) Inventors: Michael Edward Samples, Redmond, WA (US); Mikhail Smirnov, Bellevue, WA (US); Jozef Barnabas Houben, Seattle, WA (US); Damon Marlow Domjan, Seattle, WA (US); Joshua Owen Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,940

(22) Filed: Jul. 6, 2023

(65) Prior Publication Data

US 2023/0353713 A1 Nov. 2, 2023

Related U.S. Application Data

(63) Continuation of application No. 17/832,180, filed on Jun. 3, 2022, now Pat. No. 11,743,434, which is a
(Continued)

(51) Int. Cl.
*H04N 9/31* (2006.01)
*G01K 13/08* (2006.01)
(Continued)

(52) U.S. Cl.
CPC ........... *H04N 9/3135* (2013.01); *G01K 13/08* (2013.01); *G02B 26/0858* (2013.01);
(Continued)

(58) Field of Classification Search
CPC .... H04N 9/3135; H04N 9/3194; G01K 13/08; G02B 26/0858; G02B 26/101; G02B 26/0833; G02B 26/105; G06F 18/253
See application file for complete search history.

(56) References Cited

U.S. PATENT DOCUMENTS 10,484,656 B1 11/2019 Pu et al.
11,368,658 B2 * 6/2022 Samples .............. G02B 26/101
(Continued)

FOREIGN PATENT DOCUMENTS

CN 102265032 A 5/2014
CN 109565579 A 4/2021
(Continued)

OTHER PUBLICATIONS

Communication under rule 71(3) EPC, Received for European Application No. 21723045.7, mailed on Feb. 22, 2024, 09 pages.
(Continued)

*Primary Examiner* — Michael Lee
(74) *Attorney, Agent, or Firm* — Workman Nydegger

(57) ABSTRACT

A MEMS scanning device ("Device") includes at least (1) laser projector(s) controlled by a laser drive to project a laser beam, (2) MEMS scanning mirror(s) controlled by a MEMS drive to scan the laser beam to generate a raster scan, (3) a display configured to receive the raster scan, (4) a thermometer configured to detect a current temperature, (5) a display observing camera configured to capture an image of a predetermined area of the display, and (6) a computer-readable media that stores temperature model(s), each of which is custom-built using machine learning. The device uses the display observing camera to capture image(s) of predetermined pattern(s), which are then used to extract feature(s). The extracted feature(s) are compared with ideal feature(s) to identify a discrepancy. When the identified
(Continued)

discrepancy is greater than a threshold, the temperature model(s) are updated accordingly.

20 Claims, 17 Drawing Sheets

Related U.S. Application Data continuation of application No. 16/901,481, filed on Jun. 15, 2020, now Pat. No. 11,368,658.

(51) Int. Cl.
    *G02B 26/08*     (2006.01)
    *G02B 26/10*     (2006.01)
    *G06F 18/25*     (2023.01)

(52) U.S. Cl.
    CPC ......... *G02B 26/101* (2013.01); *G06F 18/253* (2023.01); *H04N 9/3194* (2013.01)

(56) References Cited

U.S. PATENT DOCUMENTS

| | | | |
|---|---|---|---|
| 11,743,434 B2 * | 8/2023 | Samples ............ | G02B 26/0833 348/759 |
| 2011/0205600 A1 | 8/2011 | Hibiya | |
| 2012/0307260 A1 * | 12/2012 | Keshavmurthy .. | G01B 11/2513 356/601 |
| 2013/0041859 A1 | 2/2013 | Esterlilne | |
| 2015/0036105 A1 * | 2/2015 | Ide ....................... | H04N 9/3132 353/31 |
| 2018/0172984 A1 * | 6/2018 | Kimura ................ | H04N 9/3185 |
| 2018/0290460 A1 | 10/2018 | Nakagawa | |
| 2018/0364483 A1 | 12/2018 | Mallinson et al. | |
| 2022/0260899 A1 * | 8/2022 | Yagi ..................... | G03B 21/206 |

FOREIGN PATENT DOCUMENTS

| | | |
|---|---|---|
| JP | 2015132768 A | 7/2015 |
| JP | 2016031522 A | 3/2016 |
| JP | 2018151496 A | 9/2018 |
| WO | 2015051820 A1 | 4/2015 |

OTHER PUBLICATIONS

Decision to grant 97(1) Received for European Application No. 21723045.7, mailed on Jun. 6, 2024, 2 pages.
U.S. Appl. No. 16/901,481, filed Jun. 15, 2020.
U.S. Appl. No. 17/832,180, filed Jun. 3, 2022.
Extended European Search Report received for European Application No. 24185830.7 mailed on Sep. 19, 2024, 12 pages.
Communication pursuant to Rules 70(2) and 70a(2) EPC received for European Application No. 24185830.7, mailed on Oct. 28, 2025, 2 Pages.
Office Action Received for Chinese Application No. 202180042869.0, mailed on Nov. 20, 2024, 9 pages (English Translation Provided).
Notice of Allowance Received for Chinese Application No. 202180042869.0, mailed on Mar. 21, 2025, 08 Pages (English Translation Provided).

* cited by examiner

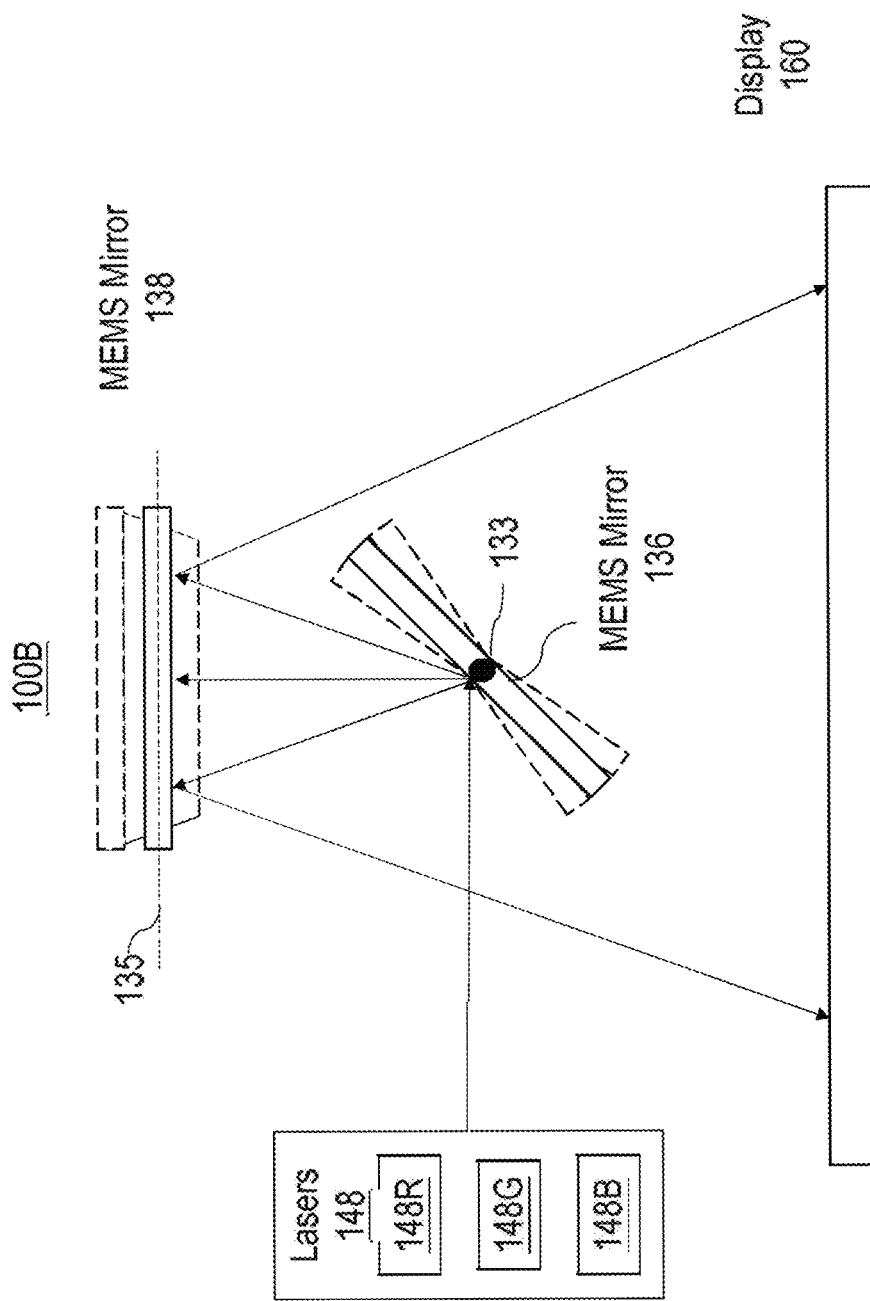

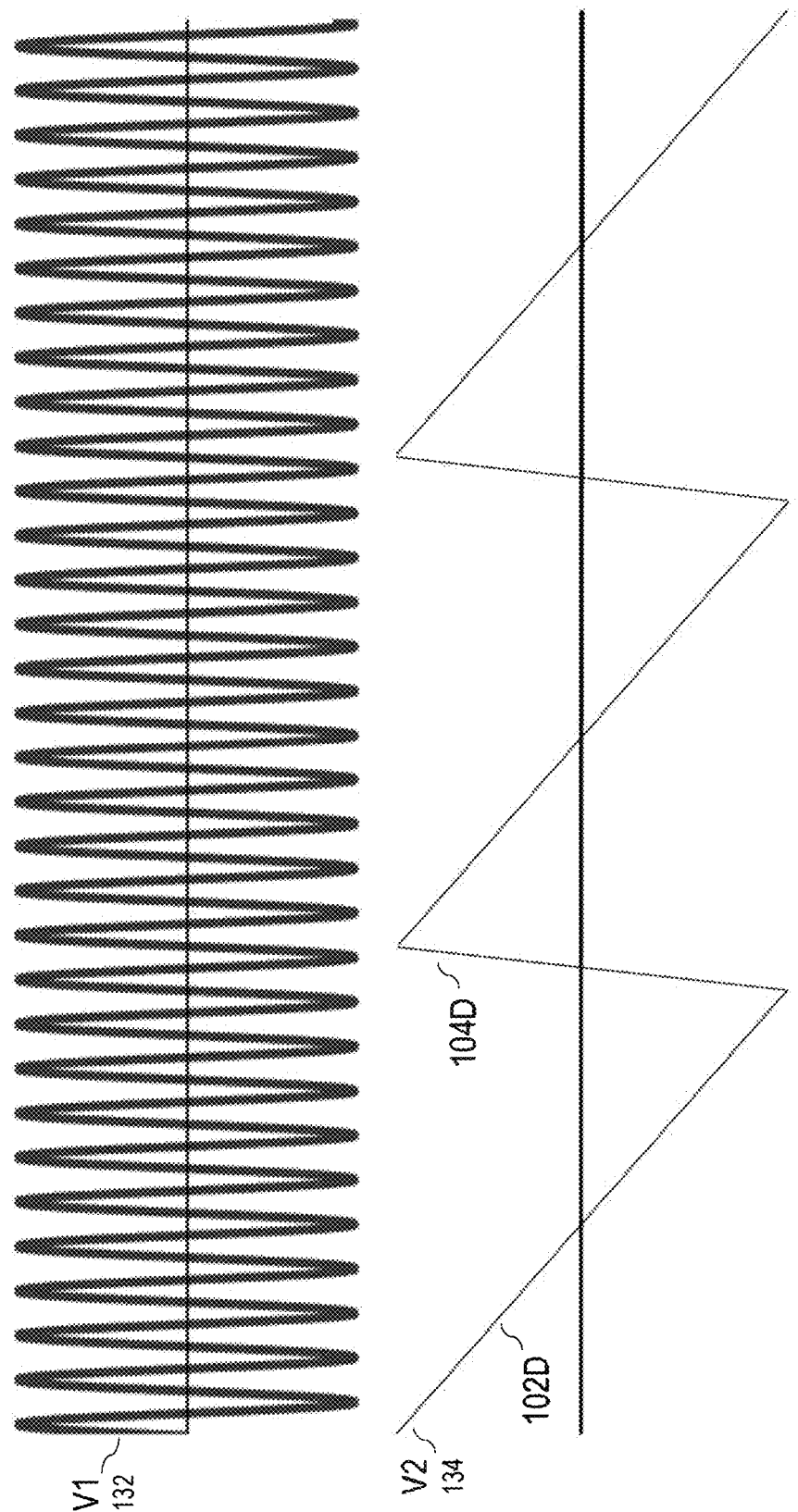

AMPLITUDE AND BIPHASE CONTROL OF MEMS SCANNING DEVICE

CROSS-REFERENCE TO RELATED APPLICATIONS

This application is a continuation of U.S. patent application Ser. No. 17/832,180 filed on Jun. 3, 2022, entitled "Amplitude and Biphase Control of MEMS Scanning Device," which is a continuation of Ser. No. 16/901,481 filed on Jun. 15, 2020, entitled "Amplitude and Biphase Control of MEMS Scanning Device," which issued as U.S. Pat. No. 11,368,658 on Jun. 21, 2022, which applications are expressly incorporated herein by reference in their entirety.

BACKGROUND

Micro-Electro-Mechanical Systems (MEMS) are miniaturized mechanical and/or electro-mechanical elements that are often made using the techniques of microfabrication. The physical dimensions of MEMS device can vary from well below one micron to several millimeters.

One type of application of MEMS is related to optical switches and micro-mirrors to redirect or modulate light beams. In some embodiments, a micro-mirror may be accurately controlled by a MEMS element to swing back and forth at a given frequency. In some embodiments, one or more laser beams (e.g., red, green, and blue beams) at different intensities may be combined into a single beam, and the single beam is relayed onto one or more MEMS scanning mirrors. The MEMS scanning mirror(s) then swing back and forth, scanning the beam in a raster pattern to project an image on a display. The raster-scanned laser beam produces the impression of a steady image using a single scanning point as long as the scanning rate is fast enough. These image(s) may then produce the impression of motion. Such projected image(s) or motion pictures can be created by modulating the one or more lasers and the position of the scanned laser beam synchronously.

However, each MEMS device may have a unique set of temperature characteristics, such that each MEMS device may behave slightly differently at a different temperature. For example, a MEMS scanning device may include one or more MEMS scanning mirrors, each of which may have its own temperature characteristics that can cause the projected image to deform or be out of specifications at high or low temperatures. Furthermore, over the lifetime of the MEMS scanning device, certain temperature characteristics may change gradually to cause the performance of the MEMS device to worsen as time goes on.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Each MEMS device may have various unique temperature characteristics, such that each MEMS device may behave slightly differently at a different temperature. For example, a MEMS scanning device may include one or more MEMS scanning mirrors, each of which has its own temperature characteristics that can cause the projected image to deform or be out of specifications at high or low temperatures. The principles described herein solve the above problem by building temperature model(s) that are custom to each MEMS scanning device using machine learning and cause the MEMS scanning device to use the custom temperature model(s) to modify its behavior based on the current temperature. Furthermore, over the lifetime of the MEMS scanning device, certain temperature characteristics may change gradually. The principles described herein also allow the MEMS scanning device to update the temperature model(s) over its lifetime using feedback obtained from a display observing camera.

The embodiments described herein are related to a MEMS scanning device. The MEMS scanning device includes one or more laser projectors, one or more MEMS scanning mirrors, a display, a thermometer, and a display observing camera. The one or more laser projectors are controlled by a laser drive to project a laser beam. The one or more MEMS scanning mirrors are controlled by a MEMS drive to scan (i.e., deflect) and to reflect the laser beam while scanning to project a raster scan on the display. The thermometer is configured to detect a temperature of the MEMS scanning device. The display observing camera is configured to capture an image of a predetermined area of the display.

The MEMS scanning device also includes one or more computer-readable media that stores one or more temperature model(s). Each of the one or more temperature model(s) is custom-built using machine learning to identify a relationship between temperature of the particular MEMS scanning device and at least one of (1) an amplitude of at least one of the MEMS scanning mirror, or (2) a phase shift of at least one of the MEMS scanning mirror. In some cases, the one or more temperature model(s) may be built at the manufacture and stored at the MEMS scanning device during the manufacturing process. Alternatively, or in addition, the one or more temperature model(s) may be built by the MEMS device itself.

As briefly mentioned above, during the lifetime of the MEMS scanning device, certain temperature characters may change gradually. The MEMS scanning device is configured to update the existing temperature model(s) using feedback received from the display observing camera. First, the MEMS scanning device uses the thermometer to detect a current temperature. Also, the MEMS scanning device projects one or more predetermined pattern(s) at the predetermined area of the display based on the current temperature and the temperature model(s). The display observing camera captures one or more image(s) of the projected pattern(s). The MEMS scanning device then extract one or more feature(s) from the captured images. The one or more feature(s) may include (but not limited to) locations of one or more points or one or more lines. The feature(s) extracted from the captured one or more image(s) are then compared with one or more ideal feature(s) to determine whether a sufficient discrepancy between the extracted feature(s) and the ideal feature(s) exists. In response to identifying a sufficient discrepancy between the features extracted from the captured image(s) and the ideal feature(s), at least one of the temperature model(s) is then updated.

In some embodiments, the updating the one or more temperature model(s) includes in response to identifying the sufficient discrepancy between the feature(s) extracted from the captured one or more image(s) and the one or more ideal feature(s), adjusting at least one of (1) the one or more control parameter(s) of the MEMS drive, or (2) the one or more control parameter(s) of the laser drive to mitigate the discrepancy. Based on the current temperature and the adjustment to the at least one control parameter(s) of the MEMS drive and/or the laser drive, at least one of the one or more temperature model(s) is then updated.

In some cases, the update of the one or more models may be triggered manually by a user. Alternatively, or in addition, the update may be automatically performed at a predetermined time interval. In some embodiments, the predetermined time interval may be adjusted based on an amount of discrepancy or an amount of adjustment in a previous update. For example, when an adjustment of at least one control parameter(s) of the MEMS drive and/or laser drive is greater than a threshold, the predetermined time interval may be decreased. Alternatively, or in addition, when an adjustment of at least one control parameter(s) of the MEMS drive and/or laser drive is lower than a threshold, the predetermined time interval may be increased.

In some embodiments, the one or more temperature model(s) may include a model representing a relationship between temperature and an amplitude of each of the MEMS scanning mirror(s). For example, the MEMS scanning device may include two single-dimensional scanning mirrors (i.e., a first scanning mirror and a second scanning mirror). The first scanning mirror scans in a first dimension at a first amplitude, and the second scanning mirror scans in a second dimension at a second amplitude. The first dimension and the second dimension intersect (e.g., are orthogonal to each other). The first scanning mirror and the second scanning mirror are configured to relay a laser beam to project a raster scan onto the display.

The one or more models include at least (1) a model representing a relationship between temperature and the first amplitude corresponding to the first scanning mirror, or (2) a model representing a relationship between temperature and a second amplitude corresponding to the second scanning mirror. In some embodiments, at least one of the one or more feature(s) is used to update the model representing the relationship between temperature and the first amplitude; and at least one of the one or more feature(s) is used to update the model representing the relationship between temperature and the second amplitude.

In some embodiments, one of the MEMS scanning mirrors is a bi-phase scanning mirror. A bi-phase scanning mirror scans the laser beam back and forth bi-directionally in a scanning cycle, and a dot projected in a forward direction of the scanning cycle and a corresponding dot projected in a backward direction of the scanning cycle are coincide in a bi-phase scanning direction. The phase of the bi-directional scan may shift slightly at different temperatures to cause the MEMS mirror and the laser projector to be out of phase. When the MEMS mirror and the laser projector are out of phase, a dot projected in a forward direction and a corresponding dot projected in a backward direction would no longer coincide. When the dots projected in two directions do not coincide, the projected image(s) may become blurry or deformed. The phase shift of the bi-directional scan may also be modeled by one of the one or more models that represents a relationship between temperature and phase shift of the bi-directional scan.

To update the model representing temperature and the phase shift of the bi-directional scan, at least one of the one or more projected predetermined pattern(s) are configured to show whether a dot projected during scanning in a forward direction and a corresponding dot projected during scanning in a backward direction substantially coincide with each other. When the dots projected during scanning in the forward direction and backward direction do not substantially coincide with each other, the model representing the relationship between temperature and the phase shift of the bi-directional scan is updated.

In some embodiments, the one or more predetermined pattern(s) may include a first pattern and a second pattern, each of which includes a first line of dots and a second line of dots. Each of the first line and second line in the first pattern and the second pattern is in a direction that intersects the scanning dimension of the bi-phase scanning mirror (e.g., is orthogonal to the scanning dimension). The first line of dots in the first pattern and the second line of dots in the second pattern are projected during scanning in the forward direction, and the second line of dots in the first pattern and the first line of dots in the second pattern are projected during scanning in the backward direction. Each of the first line and the second line of the first pattern corresponds to the respective first line and second line of the second pattern. The projected first pattern and the projected second pattern are compared to determine whether they overlap. In response to determining that the projected first pattern and the projected second pattern do not overlap, the MEMS scanning device adjust a phase of the laser drive to cause the projected first pattern and the projected second pattern to overlap. Based on the adjustment of the phase of the laser drive, the MEMS scanning device can then update the temperature model that represents the relationship between temperature and the phase shift of the bi-phase scanning mirror.

In some embodiments, the one or more MEMS scanning mirrors includes a fast-scanning mirror configured to scan in a first dimension and a slow-scanning mirror configured to scan in a second dimension. The first dimension and the second dimension intersect (e.g., are orthogonal to each other). In some embodiments, the fast-scanning mirror is a bi-phase scanning mirror that is controlled by a sinusoidal signal to scan in two directions, and the slow-scanning mirror is a single-phase scanning mirror that is controlled by a sawtooth signal to scan in only one direction. In such a case, the one or more temperature model(s) may include at least (1) a model representing a relationship between temperature and an amplitude of the fast-scanning mirror, (2) a model representing a relationship between temperature and an amplitude of the slow-scanning mirror, and/or (3) a model representing a relationship between temperature and a phase shift of the fast-scanning mirror.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 1B illustrates an example MEMS scanning device that includes two single-dimensional scanning mirrors;

FIG. 1D illustrates an example control signal of a fast-scanning mirror and an example control signal of a slow-scanning mirror;

DETAILED DESCRIPTION

The embodiments described herein are related to building custom temperature model(s) for a MEMS scanning device, and using the custom temperature model(s) to adjusts control parameter(s) of the MEMS scanning device to achieve a better display result. The embodiments described herein also allow the custom temperature model(s) to be updated through the lifetime of the MEMS scanning device.

Figure 1A:
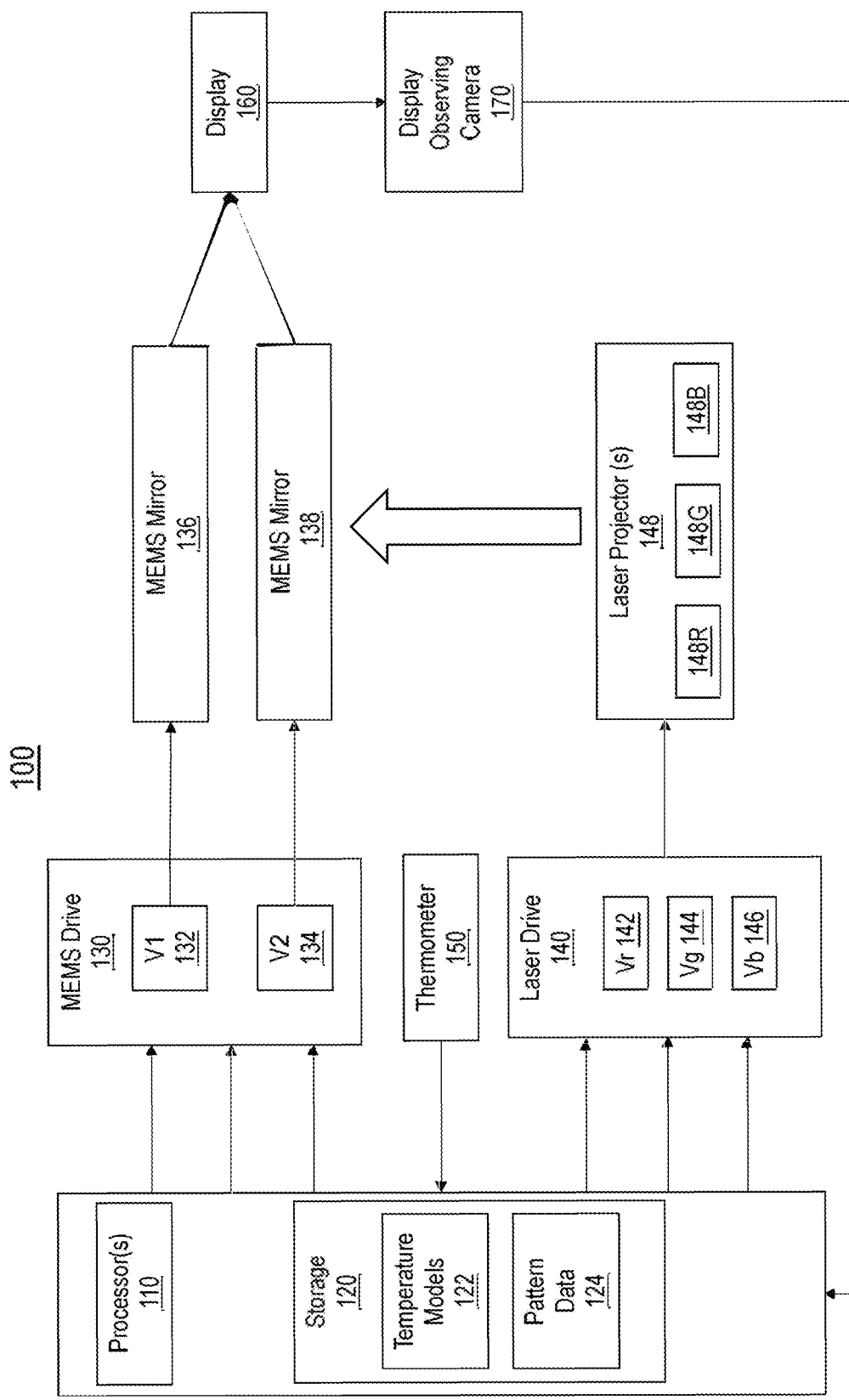
FIG. 1A illustrates an example architecture of a MEMS scanning device 100.

FIG. 1A illustrates an example architecture of a MEMS scanning device 100 (hereinafter also referred to as "the device") that is a computing system that includes one or more processors 110 and a computer-readable hardware storage 120. The device 100 also includes one or more laser projectors 148, one or more MEMS scanning mirrors 136 and/or 138, a display 160, and a thermometer 150.

The one or more laser projectors 148 are controlled by a laser drive 140 to project a laser beam onto the one or more MEMS scanning mirrors 136 and/or 138. In some embodiments, only one laser projector is implemented to project grayscale image(s). In some embodiments, the one or more laser projectors 148 includes multiple laser projectors, each of which projects a different colored laser beam. The multiple colored laser beams are merged into a single colored beam for projecting color image(s). For example, the one or more laser projectors 148 may include a red laser projector 148R, a green laser projector 148G, and a blue laser projector 148B. The red laser projector 148R is configured to project a red laser beam, the green laser projector 148G is configured to project a green laser beam, and the blue laser projector 148B is configured to project a blue laser beam. The laser drive 140 may use three different control signals or parameters Vr 142, Vg 144, and Vb 146 to control an intensity (i.e., brightness) of each of the laser projectors 148R, 148G, and 148B at different times. The three different colored laser beams, each of which is projected at a specific intensity, are joined into a single laser beam to produce desired colors. For example, if each of the red, green, and blue projectors 148R, 148G, and 148B has 256 intensity levels, a total of 16,777,216 (=256×256×256) colors may be produced.

The single laser beam is projected onto the one or more MEMS scanning mirrors 136 and/or 138. The one or more MEMS scanning mirror(s) 136 and/or 138 are controlled by a MEMS drive 130. The MEMS drive 130 causes each of the MEMS drive to deflect back and forth at an amplitude and a frequency. The amplitude and the frequency of each MEMS mirror 136 or 138 may be controlled by control signals or parameters V1 132 and V2 134. The deflection of the MEMS mirrors 136 and/or 138 causes the single laser beam to project a raster scan on the display 160.

In some embodiments, each of the MEMS mirrors 136 and 138 is a single-dimensional scanning mirror, which scans in a single dimension. The MEMS mirror 136 is configured to scan in a first dimension (e.g., horizontal), and the MEMS mirror 138 is configured to scan in a second dimension (e.g., vertical). The first dimension intersects (e.g., is orthogonal to) the second dimension. The single laser beam is first projected onto one of the MEMS mirrors 136 or 138. From the one MEMS mirrors 136 or 138, the laser beam is then reflected onto the other MEMS mirror 138 or 136. From the other MEMS mirror 138 or 136, the laser beam is then reflected onto the display 160 to generate a two-dimensional raster scan.

FIG. 1B further illustrates an example MEMS scanning device 100B of using two single-dimensional scanning mirrors 136 and 138 to project a raster scan onto a display 160. As illustrated in FIG. 1B, the laser projectors 148 first projects a single beam onto the MEMS mirror 136. The MEMS mirror 136 is configured to deflect about an axis 133 to scan a single-dimensional line. The single-dimensional line is reflected from the MEMS mirror 136 onto the MEMS mirror 138, which deflects about an axis 135. The axis 133 and the axis 135 intersect (e.g., are orthogonal to each other), such that the single-dimensional line received by the MEMS mirror 138 is scanned into a two-dimensional raster scan image, which is finally projected onto the display 160.

Figure 1C:
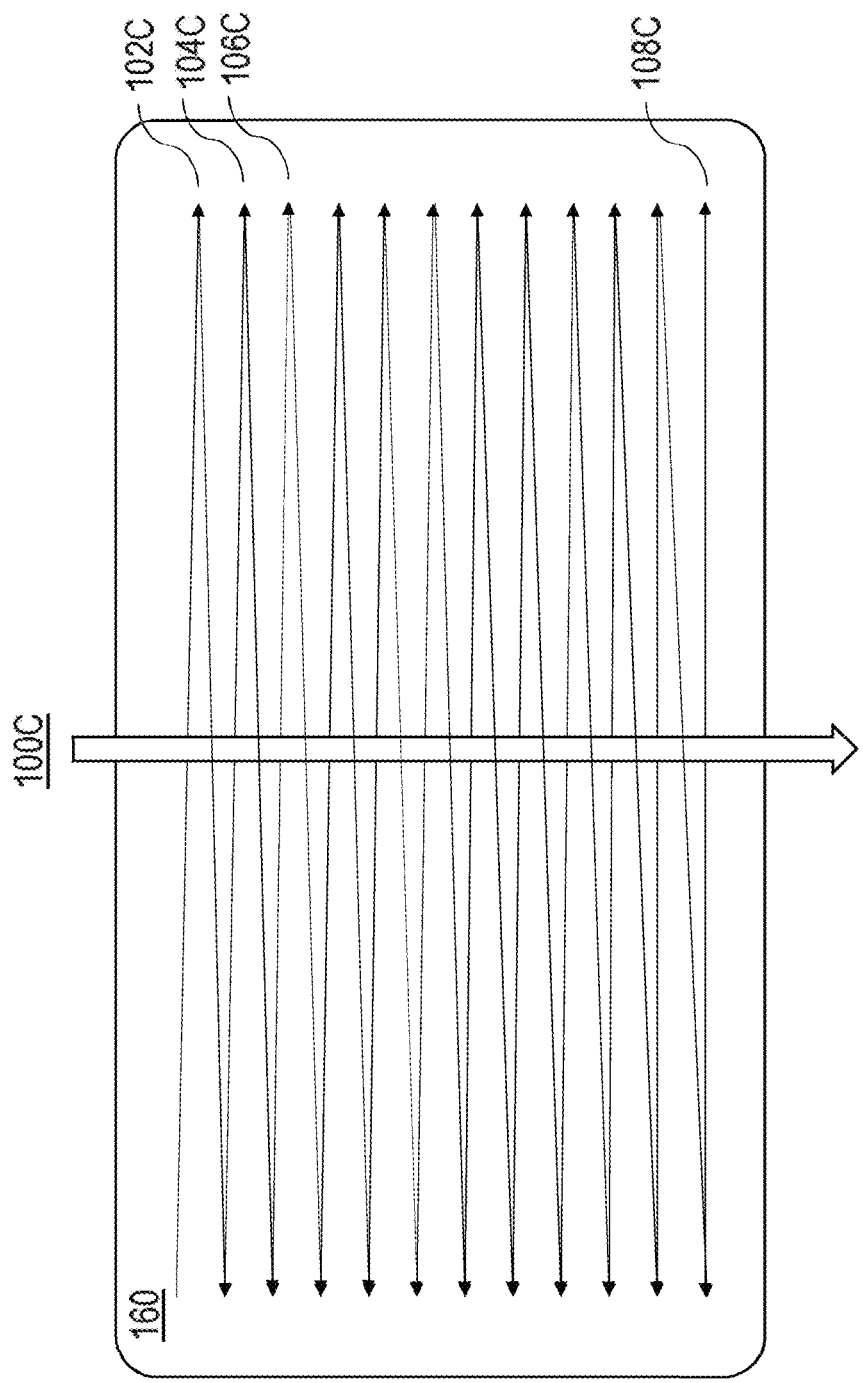
FIG. 1C illustrates an example sequence of raster scan.

FIG. 1C illustrates an example sequence of raster scan 100C. As illustrated in FIG. 1C, a first cycle 102C is first drawn at the top of the display 160 by a first mirror (e.g., the first mirror 136 of FIG. 1B) scanning back and forth in a first dimension. At the same time, a second mirror (e.g., the second mirror 138 of FIG. 1B) deflects gradually to cause the lines scanned by the first mirror to gradually shift in a second dimension. Similarly, a second cycle 104C and a third cycle 106C are continuously drawn by the first mirror below the first cycle 102C and the gradually deflecting second mirror, and so on and so forth, until the last cycle or line 108C is drawn on the display. Then, the second mirror deflects all the way back to the starting position of the cycle 102C to restart drawing a next frame of image. As illustrated in FIG. 1C, the first mirror scans (horizontally) at a much faster frequency than the second mirror (that scans vertically), because after the first mirror has scanned all the cycles 102C-108C, the second mirror just finishes a first cycle. As such, the first mirror is also called a fast-scanning mirror, and the second mirror is also called a slow-scanning mirror.

A MEMS mirror often has a resonate frequency, which is determined by its mass, structure, and spring constant. In some embodiments, the fast mirror's deflection frequency is controlled to be close to the mirror's resonate frequency to obtain a large mirror deflection angle with a small current.

FIG. 1D illustrates an example control signal V1 132 of a fast-scanning mirror and an example control signal V2 134 of a slow-scanning mirror. As illustrated in FIG. 1D, the fast-scanning mirror may be controlled by a substantially sinusoidal signal at a first frequency, and the slow-scanning mirror may be controlled by a substantially sawtooth signal at a second frequency. The first frequency is much faster than the second frequency. Also, in some embodiments, the fast-scanning mirror may be a bi-phase scanning mirror that scans back and forth bi-dimensionally to project a line, such that an image is drawn by lines projected in both directions. The slow-scanning mirror is often a single-phase scanning mirror that scans only in one direction, as such, the laser beam is projected only during the first edge 102D of the sawtooth signal 134. During the second edge 104D of the sawtooth signal 134, the laser projectors 148 may be turned off, so that no laser beam is projected onto the display 160.

In some embodiments, the two-dimensional raster scan may also be achieved by a single two-dimensional scanning mirror. A two-dimensional scanning mirror scans in two dimensions (i.e., a first dimension and a second dimension). The first dimension intersects (e.g., is orthogonal to) the second dimension. The MEMS drive 130 may use a first control signal or parameter V1 132 to control the mirror's deflection in the first dimension, and use a second control signal V2 134 to control the mirror's deflection in the second dimension. In such a case, the single laser beam is projected onto the single two-dimensional scanning MEMS mirror, and the single MEMS mirror itself is capable of reflecting the laser beam onto the display 160 to generate a two-dimensional raster scan. The principles described herein are applicable to embodiments that implement two single-dimensional mirrors and/or embodiments that implement a single two-dimensional mirror.

Notably, the laser projectors 148 and the MEMS mirror(s) 136 and/or 138 must be substantially synchronized at all times to project a clear image of a raster scan. In other words, each of the control parameter(s) V1 132, V2 134, Vr 142, Vg 144, Vb 146 must be substantially synchronized at all times.

However, since each MEMS mirror 136 or 138 and/or certain other component(s) of the device 100 may have various unique temperature characteristics, when temperature changes, the MEMS mirror 136 or 138 and/or the other component(s) may behave slightly differently to cause the raster scan to be deformed or cause the laser projectors 148 and the MEMS mirror(s) 136 and/or 138 to be out of sync.

The principles described herein solve the above-mentioned problem by building one or more temperature model (s) 122 that are custom to each device 100 using machine learning and storing the one or more temperature model(s) 122 in a storage 120 of the device 100. Each of the one or more temperature model(s) 122 is custom-built using machine learning to identify a relationship between the temperature of the particular MEMS scanning device 100 and at least one of (1) an amplitude of at least one of the MEMS scanning mirrors 136 or 138, or (2) a phase shift of at least one of the MEMS scanning mirror 136 or 138. In some cases, the one or more temperature model(s) 122 may be built at the manufacture and stored at the device 100 during the manufacturing process. Alternatively, or in addition, the one or more temperature model(s) 122 may be built by the MEMS device 100 itself when a user is in control of the device 100.

Referring back to FIG. 1A, the device 100 also includes a thermometer 150. The thermometer 150 is configured to detect a current temperature of the device 100. The thermometer 150 may be installed next to the MEMS scanning mirrors 136 or 138 or be installed anywhere in a housing of the device 100. In some embodiments, a separate thermometer 150 may be implemented for each MEMS scanning mirror 136 or 138 to be able to more accurately obtain a current temperature of the corresponding MEMS scanning mirror 136 or 138.

Based on the one or more temperature model(s) 122 and the current temperature, the processor 110 of the device adjusts one or more control parameter(s) (including, but not limited to V1 132, V2 134, Vr 142, Vg 144, Vb 146) of the MEMS drive 130 and/or laser drive 140, such that the device 100 is calibrated based on the current temperature. In some embodiments, the thermometer 150 updates a current temperature at a predetermined time interval (e.g., 5 minutes). When the current temperature is sufficiently different from a previous temperature (i.e., the difference between the current temperature and a previous temperature is greater than a threshold), the one or more control parameter(s) may be adjusted based on the temperature model(s).

Additionally, as briefly mentioned above, over the lifetime of the MEMS scanning device 100, certain temperature characteristics may change gradually. The principles described herein also allow the MEMS scanning device 100 to update the temperature model(s) 122 over its lifetime using feedback obtained from a display observing camera 170.

As illustrated in FIG. 1A, in some embodiments, the device 100 also includes a display observing camera 170 that is configured to capture image(s) of a predetermined area of the display 160. The device 100 is configured to project one or more predetermined pattern(s) 124 (which may be stored at the storage 120 of the device 100) at the predetermined area of the display 160. At the same time, the thermometer 150 also obtains a current temperature. Thus, the one or more predetermined pattern(s) 124 are projected based on the one or more temperature model(s) 122. The display observing camera 170 then captures one or more image(s) of the projected pattern(s), which are used to extract one or more feature(s). The one or more feature(s) include (but are not limited to) one or more dots or one or more lines. The captured one or more feature(s) are then compared with one or more predicted ideal feature(s) to determine whether a sufficient discrepancy between the feature(s) extracted from the captured image(s) and the predicted ideal feature(s) exist. In response to identifying a sufficient discrepancy between the features extracted from the captured image(s) and the ideal feature(s), the processor 110 of the device 100 may cause the MEMS drive 130 and/or the laser drive 140 to adjust the control parameter(s) V1 132, V2 134, Vr 142, Vg 144, and/or Vb 146 to mitigate the discrepancies. Based on the adjustment, the processor 110 may then cause at least one of the temperature model(s) 122 to be adjusted.

In some cases, an update of the temperature model(s) may be manually triggered by a user. In some cases, the device 100 automatically tries to update its temperature model(s) 122 at a predetermined frequency (e.g., 5 minutes, 5 days, etc.). In some embodiments, the predetermined frequency may be adjusted based on the adjustment(s) made in the current update. For example, when the adjustment is greater than a predetermined threshold, the processor 110 of the device 100 may increase the update frequency; and when the adjustment is lower than a predetermined threshold, the processor 110 of the device may decrease the update frequency.

Since the principles described herein are related to MEMS mirrors, a brief description of MEMS mirrors is provided with respect to FIGS. 2-5. A MEMS mirror is a miniature mirror that incorporates MEMS technology. Several different MEMS technologies may be implemented to accurately control the mirror, including (but not limited to) using an electromagnetic field, a piezoelectric element, and/or an electrostatic force.

Figure 2:
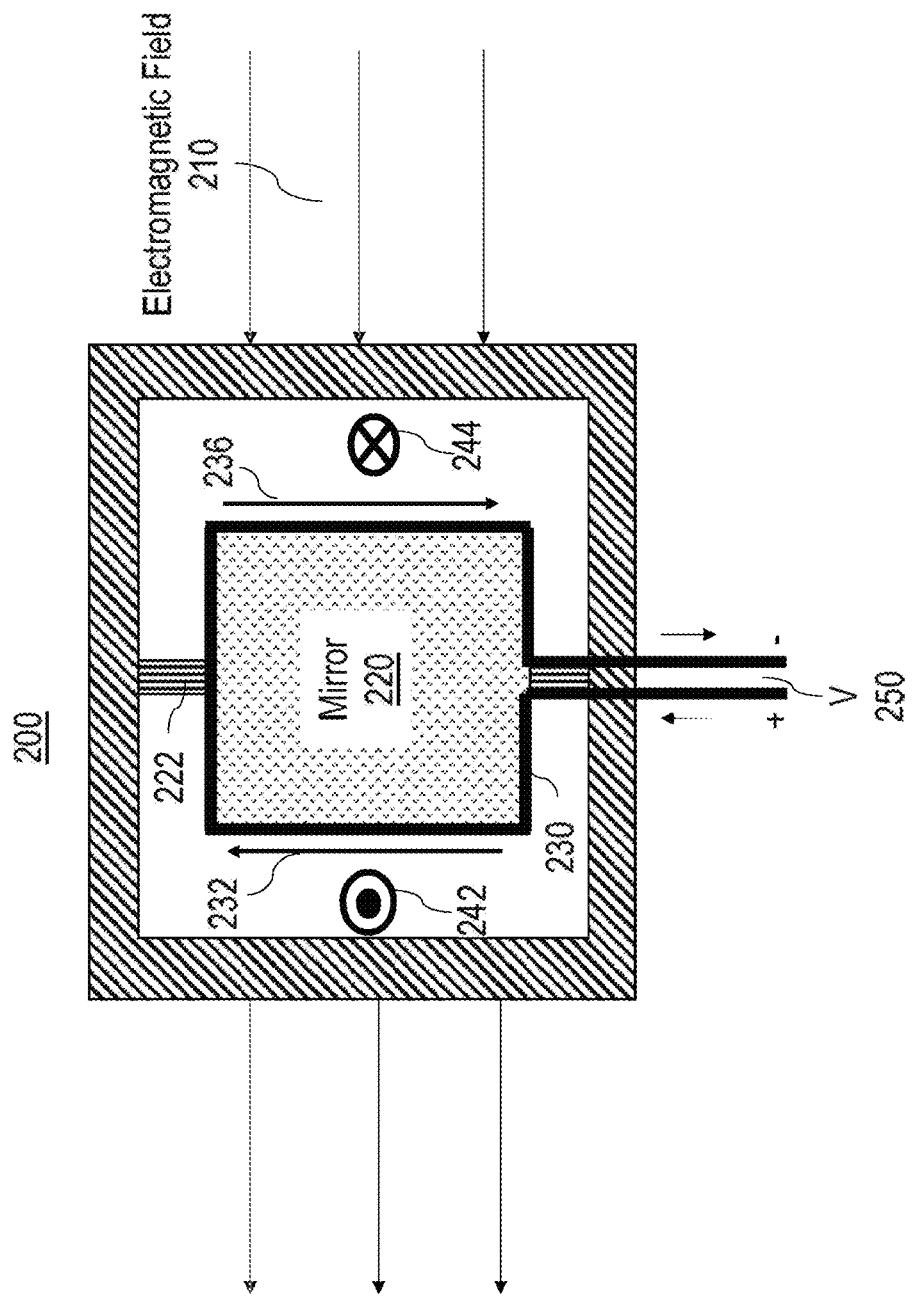
FIG. 2 illustrates an example MEMS mirror that is actuated by an electromagnetic field.

FIG. 2 illustrates an example MEMS mirror 200 that is actuated by an electromagnetic field 210. As illustrated in FIG. 2, the MEMS mirror 200 includes a mirror 220 that is suspended by a torsion bar 222 in the electromagnetic field 210. The electromagnetic field 210 may be generated by a magnet (not shown). Within the generated electromagnetic field 210, an electrical current is caused to flow in a coil 230 surrounding the mirror 220. Based on Fleming's rule, the current (represented by arrow 232) produces Lorentz force 242 at the left edge of the mirror 220; at the same time, the current (represented by arrow 236) produces Lorentz force 244 in an opposite direction at the right edge of the mirror 220. The opposite forces 242 and 244 drive the mirror 220 to deflect. As such, the deflection of the mirror 220 can be controlled by the electrical current flowing through the coil 230 and/or a voltage V 250 applied onto the coil 230.

The MEMS mirror 200 is a single-dimensional mirror that includes a single torsion bar 222 that allows the mirror 220 to deflect along a single line. In some embodiments, a second torsion bar may be implemented to allow the mirror to deflect in two dimensions.

Figure 3:
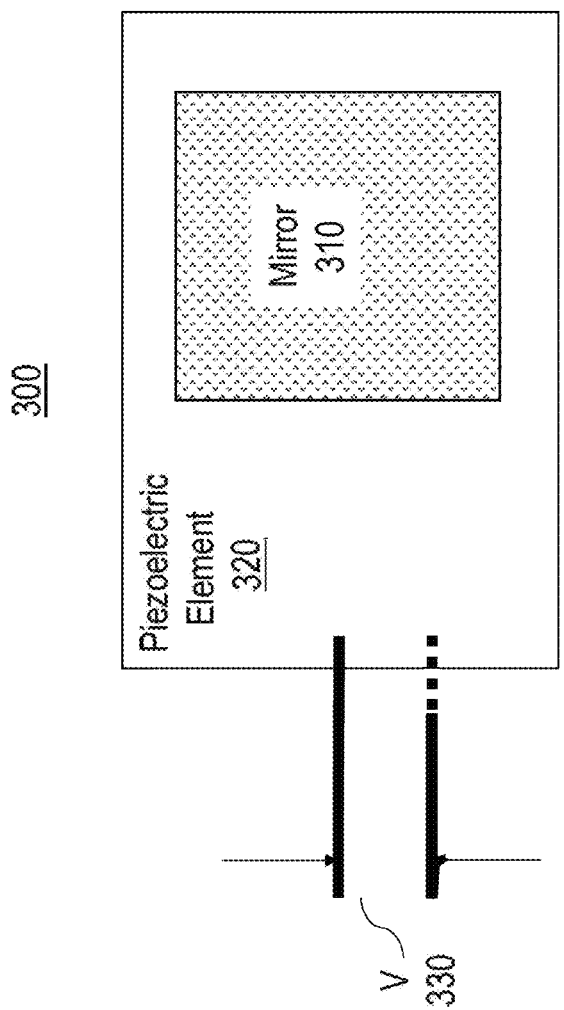
FIG. 3 illustrates an example MEMS mirror that is actuated by a piezoelectric element.

FIG. 3 illustrates another example MEMS mirror 300 that is actuated by a piezoelectric element 320. A piezoelectric element 320 deforms when a voltage 330 is applied onto two opposite sides of the piezoelectric element 320. The mirror 310 attached onto the piezoelectric element 320 would deflect following the deformation of the piezoelectric element 320.

Figure 4:
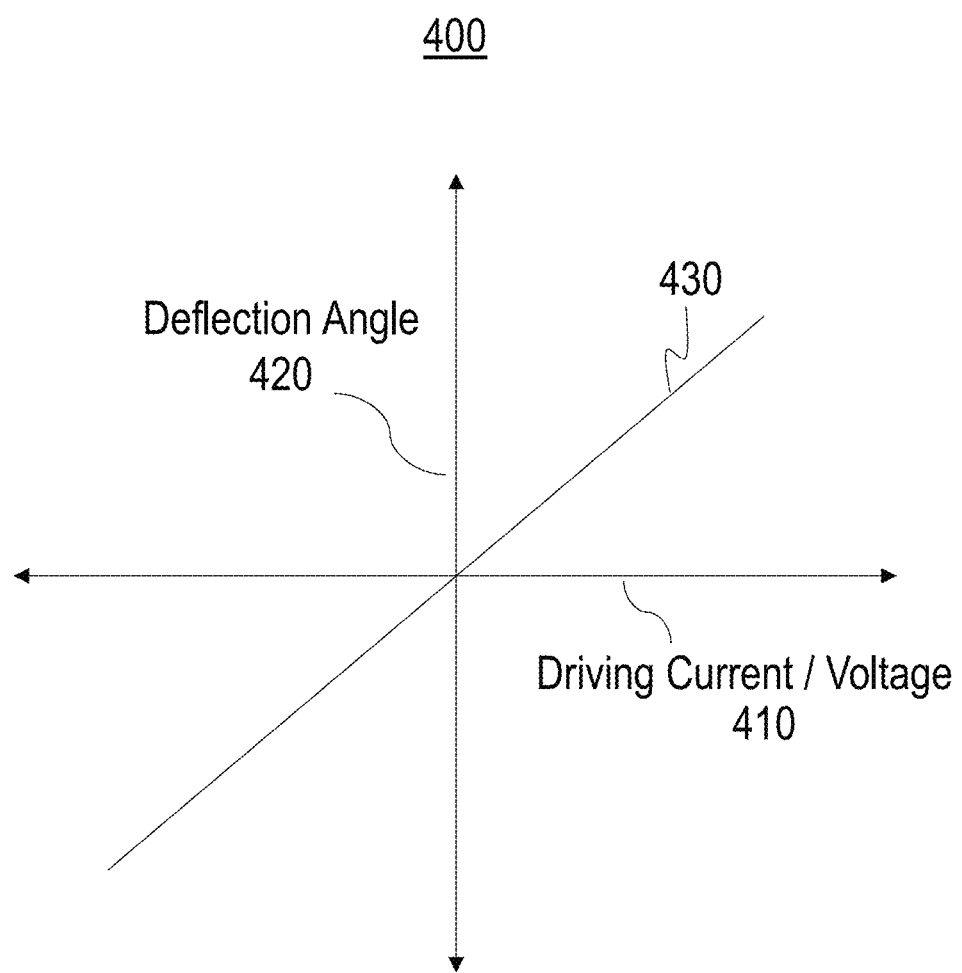
FIG. 4 illustrates a line graph that shows a substantially linear relationship between a driving current or voltage and a deflection angle of a MEMS mirror.

FIG. 4 illustrates a line graph 400 that shows a substantially linear relationship between a driving current or voltage and a deflection angle of a MEMS mirror. The driving current or voltage may correspond to driving voltage 250 and/or driving current 232, 236 of FIG. 2 and/or driving voltage 330 of FIG. 3. As illustrated in FIG. 4, the horizontal axis 410 represents the driving current or voltage, and the vertical axis 420 represents the MEMS mirror's deflection angle. The line 430 represents the substantially linear relationship between the driving current and the deflection angle. Generally, the greater the driving current or voltage, the greater the deflection angle. When the driving current or voltage changes its direction (e.g., becomes negative), the deflection angle also changes its direction.

The MEMS mirror 200 or 300 may correspond to one of the MEMS mirrors 136 and 138 of FIG. 1A. The voltage V 250, 330 or current 232, 236 may correspond to the control parameter(s) V1 132 and/or V2 134. As such, the MEMS drive 130 may be configured to adjust the voltage V 250 or 330 or the current 232 or 236 to control the deflection of the MEMS mirror 220.

In the MEMS mirrors 200 or 300, the coil resistance, the magnetic force of the magnet, the resonant frequency, the piezoelectric element, and certain other components may all have their own temperature characteristics. The principles described herein take into account the temperature characteristics of each individual MEMS mirror to allow the more accurate control of the mirror's optical deflection angle over a wide temperature range.

For example, in an electric-magnetic MEMS mirror (e.g., MEMS mirror 200 of FIG. 2), when temperature increases, the coil resistance (e.g., the resistance of coil 230) increases, which reduces the current that flows through the coil. The reduced current, in turn, reduces the optical deflection angle. Furthermore, even if the current, flowing through the coil 230, remains the same, the magnetic force also reduces when temperature drop, which also, in turn, reduces the optical deflection angle.

Figure 5C:
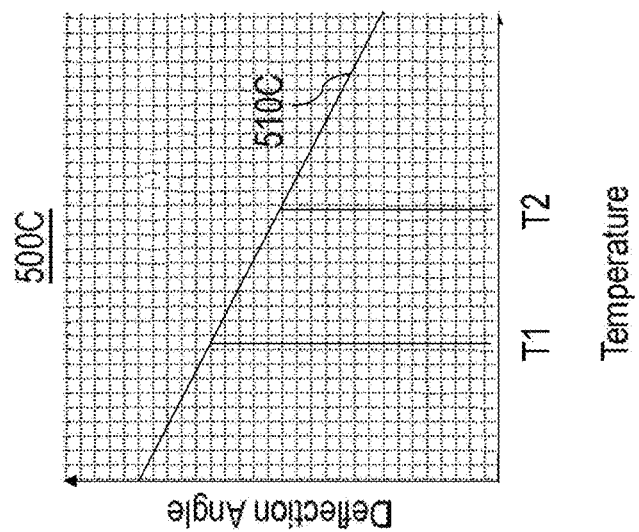
FIG. 5C illustrates a line graph that shows a substantially linear relationship between temperature and the deflection angle of a MEMS mirror.
Figure 5B:
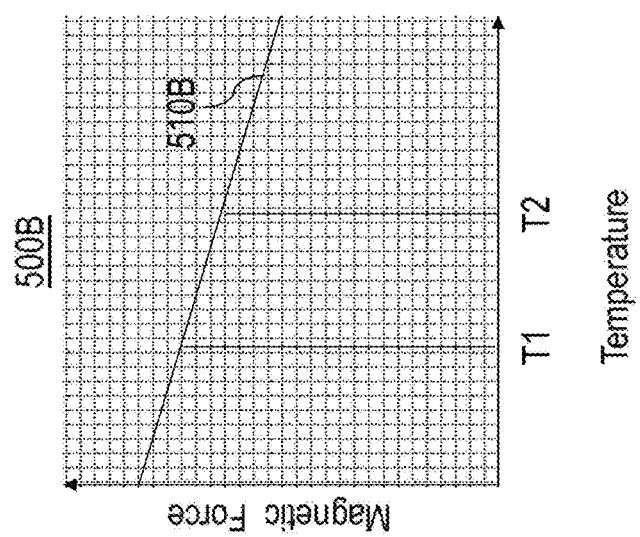
FIG. 5B illustrates a line graph that shows a substantially linear relationship between temperature and magnetic force generated by a constant current flowing through the coil.
Figure 5A:
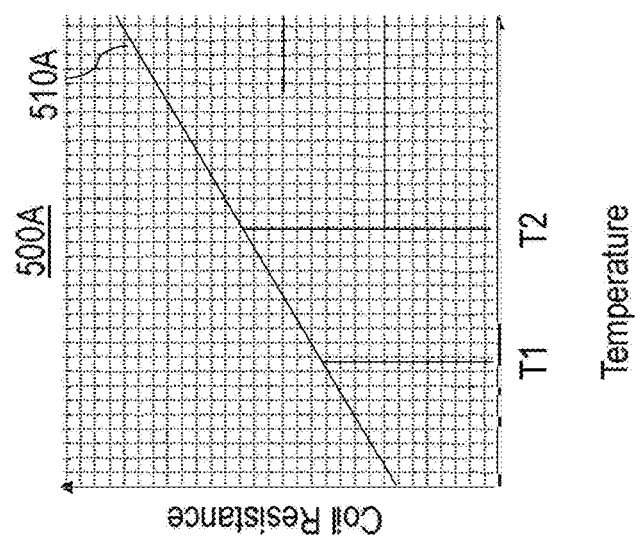
FIG. 5A illustrates a line graph that shows a substantially linear relationship between temperature and coil resistance of an electromagnetic MEMS mirror.

FIG. 5A illustrates a line graph 500A, showing a substantially linear relationship between temperature and coil resistance. The horizontal axis in FIG. 5A represents temperature, and the vertical axis in FIG. 5A represents coil resistance. The line 510A represents a substantially linear relationship between temperature and the coil resistance. The coil resistance increases when the temperature increases. For example, as illustrated in FIG. 5A, temperature T2 is greater than temperature T1, and the coil resistance at temperature T2 is greater than the coil resistance at temperature T1.

FIG. 5B illustrates a line graph 500B, showing a substantially linear relationship between temperature and the magnetic force when the current flowing through the coil remains the same. The horizontal axis in FIG. 5B represents temperature, and the vertical axis represents the magnetic force. The line 510B represents a substantially linear relationship between temperature and the coil resistance. As illustrated in FIG. 5B, temperature T2 is greater than temperature T1, and the magnetic force at temperature T2 is greater than the magnetic force at temperature T1.

The coil resistance and the magnetic field are merely two example factors that may affect the deflection angle or amplitude of the mirror. Additional factors may also have effects. For example, the resonance rate of the mirror may also change when the temperature changes. As another example, in a piezoelectric mirror, the piezoelectric effect may also be affected by temperature.

Due to these various temperature-related factors, the MEMS mirror's deflection angle generally reduces when the temperature increases (given that the control parameter(s), such as driving current or voltage, remain the same). FIG. 5C illustrates a line graph 500C, showing a substantially linear relationship between temperature and deflection angle of a MEMS mirror. The horizontal axis in FIG. 5C represents temperature, and the vertical axis represents the deflection angle. The line 510C represents a substantially linear relationship between temperature and deflection angle of a MEMS mirror when the control parameter(s) remain the same. As illustrated in FIG. 5C, temperature T2 is greater than temperature T1, and the deflection angle at temperature T2 is smaller than the deflection angle at temperature T1.

When the MEMS mirror deflects at a greater angle, the laser beam reflected by the MEMS mirror will cover a greater width or area on the display. Thus, the deflection angle of a MEMS mirror may also be referred to as amplitude. As shown in FIG. 5C, the amplitude (or deflection angle) of a MEMS mirror and temperature have a substantially linear relationship. However, since each MEMS mirror is slightly different from the others, a different linear relationship may exist for each MEMS mirror.

To take into account the individuality of each MEMS mirror, the principles described herein implement machine learning to observe each individual MEMS scanning device to obtain each MEMS mirror's amplitude-temperature relationship. In some embodiments, one or more predetermined pattern(s) are projected onto a MEMS scanning device. The one or more predetermined pattern(s) may include pattern(s) that has multiple lines in a scanning direction (e.g., horizontal or vertical). For example, one predetermined pattern may include multiple horizontal white lines; and another predetermined pattern may include multiple vertical white lines. In some embodiments, a single set of patterns is projected, and one or more features (e.g., one or more dots or lines) are extracted from the projected patterns. In some embodiments, the projected pattern(s) may extend across the width of the display. In some embodiments, the projected pattern(s) may be contained in a predetermined area of the display.

The current temperature and the projected pattern(s) are monitored for a period of time (e.g., 20-25 minutes). The current temperature may be obtained by the thermometer 150 of the device 100. The projected pattern(s) may be monitored by the display observing camera 170 of the device 100 or by an exterior camera (not shown). In some embodiments, the temperature and projected image(s) are gathered at a predetermined frequency (e.g., every second). In some embodiments, the projected image(s) may be gathered only when the temperature has sufficiently changed.

Figure 6:
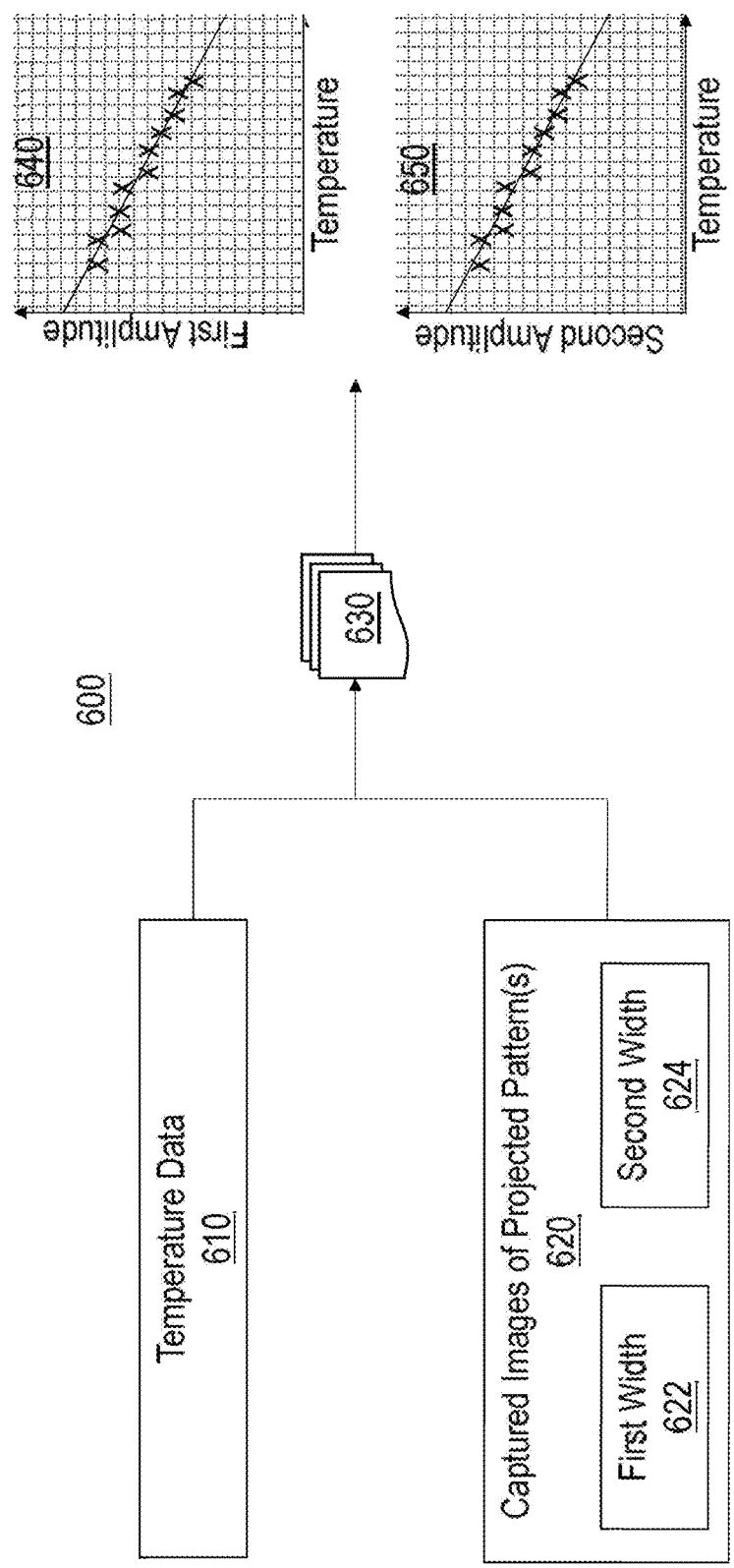
FIG. 6 illustrates an example machine learning network that may be implemented to learn the relationship between temperature and an amplitude of a MEMS mirror.

FIG. 6 illustrates an example machine learning network 600 that may be implemented to "learn" the relationship between temperature and amplitude(s) of a MEMS mirror 136 or 138. The temperature data 610 and the captured image(s) of the projected pattern(s) 620 are fed into a linear regression network 630. For each captured image of the projected pattern 620, there is a first width 622 of the image (e.g., horizontal dimension) and a second width 624 of the image (e.g., vertical dimension). Each first width 622 or second width 624 and a corresponding temperature 610 form a data pair. All the data pairs, including the first widths 622 and the corresponding temperatures 610, form a first dataset; and all the data pairs, including the second widths 624 and their corresponding temperatures 610, form a second dataset.

Based on the first dataset and the second dataset, a linear relationship between temperature and the first width 622 and the second width 624 can be obtained. Since each of the first width 622 and second width 624 corresponds to a first amplitude or second amplitude of a corresponding MEMS mirror 136 or 138, a linear relationship 640 between temperature and the first amplitude and a linear relationship 650 between temperature and the second amplitude may also be obtained. Such relationships 640 and 650 may then be stored at the storage 120 of the MEMS scanning device 100 as two of the temperature model(s) 122. The MEMS scanning device 100 can then use the temperature model(s) 122 to adjust its control signals or parameters V1 132 and/or V2 134 to cause a proper amplitude of each MEMS mirror 136 or 138 to be obtained based on a current temperature.

In addition to the temperature characteristics related to the amplitude, when bi-phase scanning is implemented, the synchronization of the bi-phase scan is also related to temperature. As briefly described above with respect to FIGS. 1B through 1D, there may be a fast-scanning mirror 136 and a slow-scanning mirror 138. The fast-scanning mirror 136 may use a substantially sinusoidal signal to draw lines in the horizontal direction. Bi-phase scanning is referred to using both phase scanning (i.e., scanning forward and scanning backward) to draw lines on the display. When bi-phase scanning is implemented, lines drawn in the forward scanning and lines drawn during the backward scanning are both used to project images on the display.

Figure 7A:
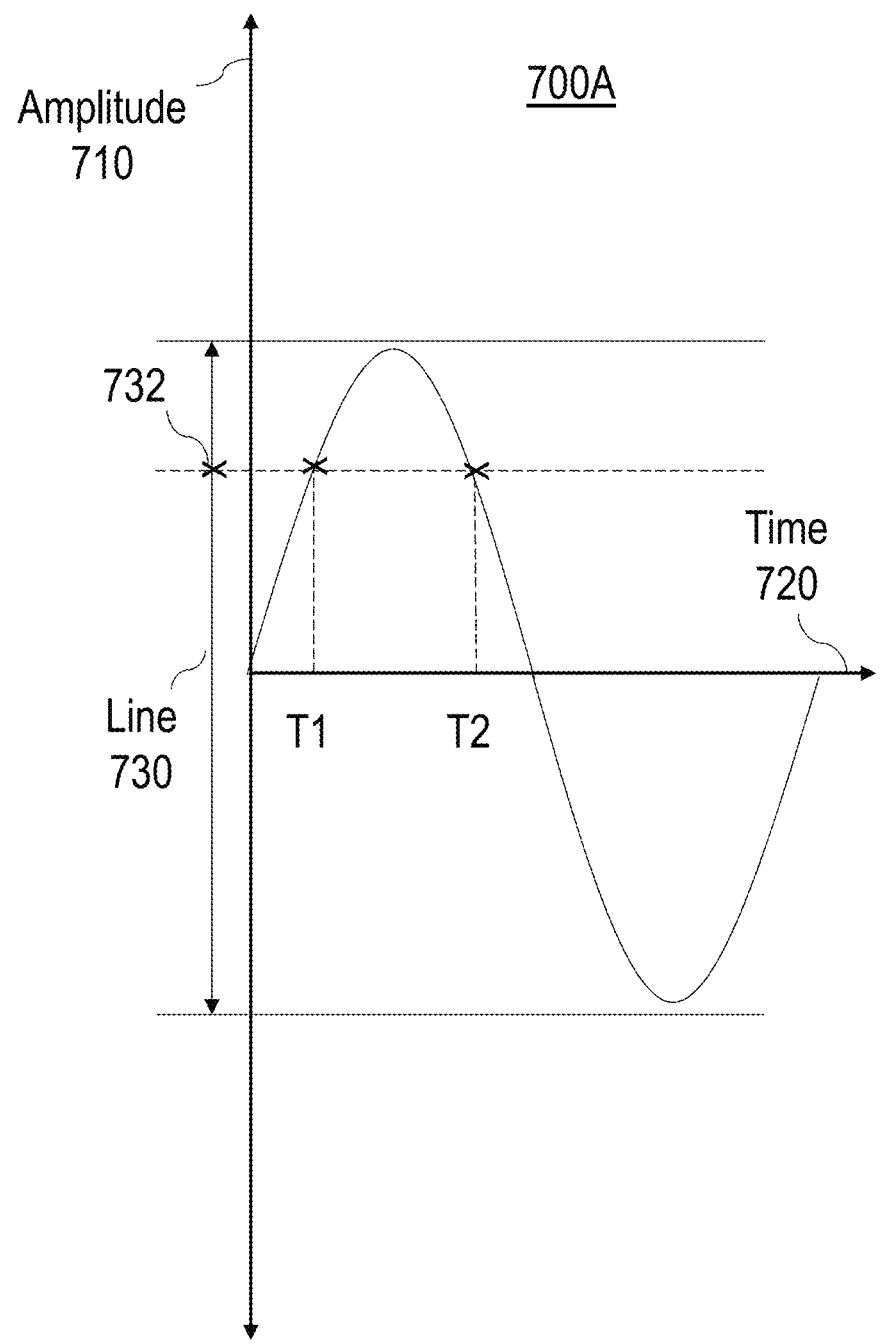
FIG. 7A illustrates a graph that represents an example bi-phase scanning cycle.

FIG. 7A illustrates a graph that represents an example bi-phase scanning cycle 700A. The horizontal axis 710 represents an amplitude of a fast-scanning mirror (e.g., mirror 136), the vertical axis 720 represents time. During the bi-phase scanning cycle, the bi-phase scanning mirror scans back and forth in the horizontal direction. The line 730 may correspond to any one of the cycles 102C through 108C of FIG. 1C. Notably, any point on the line 730 corresponds to two dots drawn during a same cycle: (1) one is drawn during the forward scanning, and (2) one is drawn during the backward scanning. Even though the two corresponding dots should be considered distinct, and may in general be drawn using a different color code (i.e. different intensities for the lasers), if the bi-phase is correct, the two corresponding dots should coincide on the horizontal axis, but still be separate along the other axis of the other mirror. When bi-phase is incorrect, such corresponding dots will be separated along both axis. For example, when bi-phase is correct, the two corresponding points 732 are drawn at the times T1 and T2.

In an ideal case, the amplitude of the scanning mirror corresponds to the control signal closely, such that when a sinusoidal control signal is applied onto the scanning mirror, a corresponding sinusoidal amplitude is generated. However, in reality, there is always a phase shift or delay between the control signal and the amplitude of the scanning mirror. The amount of the phase shift is related to temperature. In general, the higher the temperature, the greater the phase delay may occur. The laser drive 140 must be synchronized with the phase of the mirror to cause the projected image to be clear and not deformed.

Figure 7B:
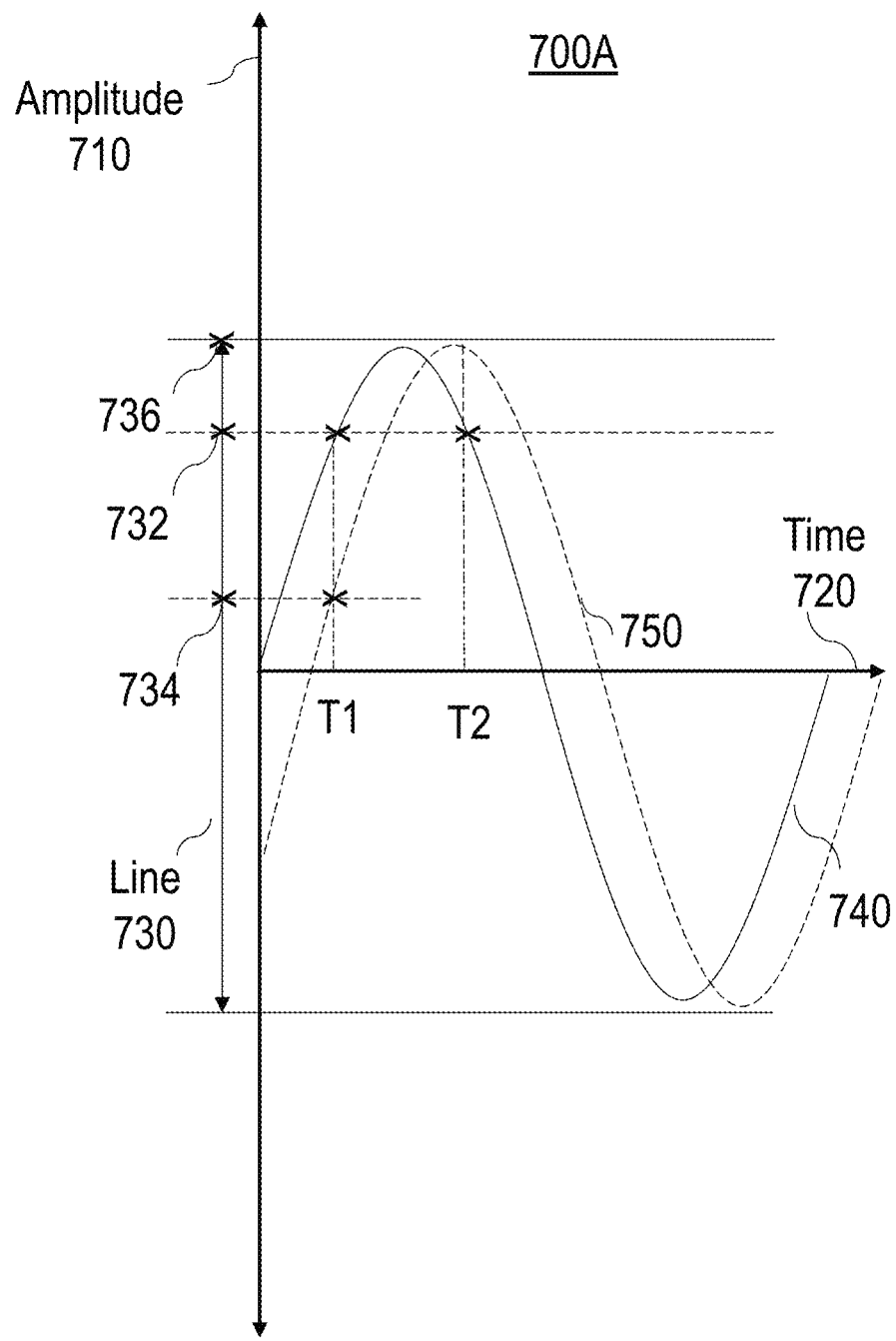
FIG. 7B illustrates a graph that represents an example phase shift of a bi-phase scanning cycle.

FIG. 7B illustrates an example of phase shift of a MEMS scanning mirror. As illustrated in FIG. 5B, the dotted line 750 illustrates an amplitude of a MEMS mirror that is shifted from the amplitude 740 (drawn in solid line). Assuming the laser drive 140 is projecting a laser beam based on the amplitude 740, to draw the corresponding dots at position 732, the laser beam is projected at time T1 and T2. However, if, in fact, the amplitude has shifted to dotted line 750, at time T1, a first dot will be drawn at point 734; and at time T2, a second dot will be drawn at 736. Apparently, in this exaggerated example, the two dots 734 and 736 (which are supposed to coincide on the horizontal axis) are far apart. This will clearly affect the resulting image projected on the display. The same principles apply when there is a slight phase shift when temperature changes, and even when there is a slight shift of the phase, the bi-phase scan may cause the two corresponding dots to be projected at two slightly different places in the bi-phase scanning direction, resulting a blurry and/or deformed image.

The relationship between temperature and phase shift of the scanning mirror may also be learned via a machine learning network by projecting one or more predetermined pattern(s) on the display 160 of the device and monitoring the projected image for a period of time. The one or more predetermined pattern(s) here are different from the pattern(s) used to learn the relationship between temperature and amplitude. Here, the one or more predetermined pattern(s) may include two lines of dots, each of which is parallel to the slow-scanning direction (i.e., intersects the fast-scanning direction). In a first pattern, the first line is drawn by scanning forward only, and the second line is drawn by scanning backward only. In a second pattern, the first line is drawn by scanning backward only, and the second line is drawn by scanning forward only. A set of image(s) are taken for each of the projected first pattern and the second pattern. When the phase of the amplitude and the phase of the laser drive are synchronized, the two image(s) will overlap. However, when there is a phase shift, the two image(s) would not overlap. In particular, in one image, the two lines are further apart; and in the other image, the two lines are closer to each other.

Figure 8:
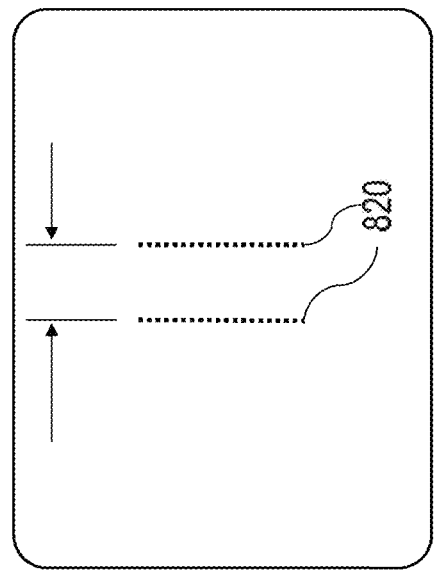
FIG. 8 illustrates an example set of pattern(s) that may be used to detect a phase shift of a bi-phase scanning mirror.
Figure 8:
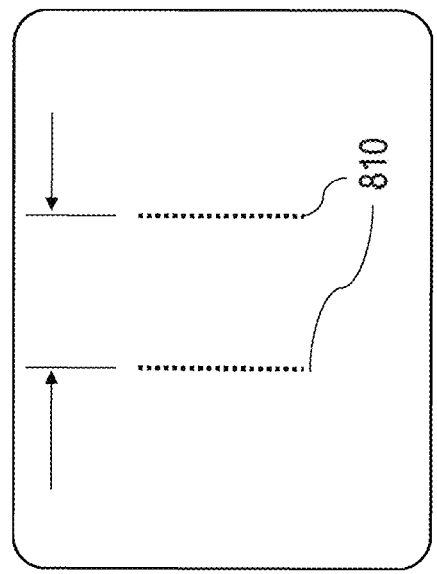

FIG. 8 illustrates an example set of the first pattern 810 and second pattern 820 that may be projected on the display 160 to identify a phase shift of a scanning mirror 136 or 138. An external camera or an internal camera 170 of the device 100 may take a picture of the two images, and compare the two images to determine whether there is a phase shift. As illustrated in FIG. 8, the two lines projected in the first pattern 810 is further apart than the two lines projected in the second pattern 820, which indicates a phase shift between the amplitude of the MEMS mirror and the phase of the laser drive. At the same time, the thermometer 150 also obtains a current temperature.

Figure 9:
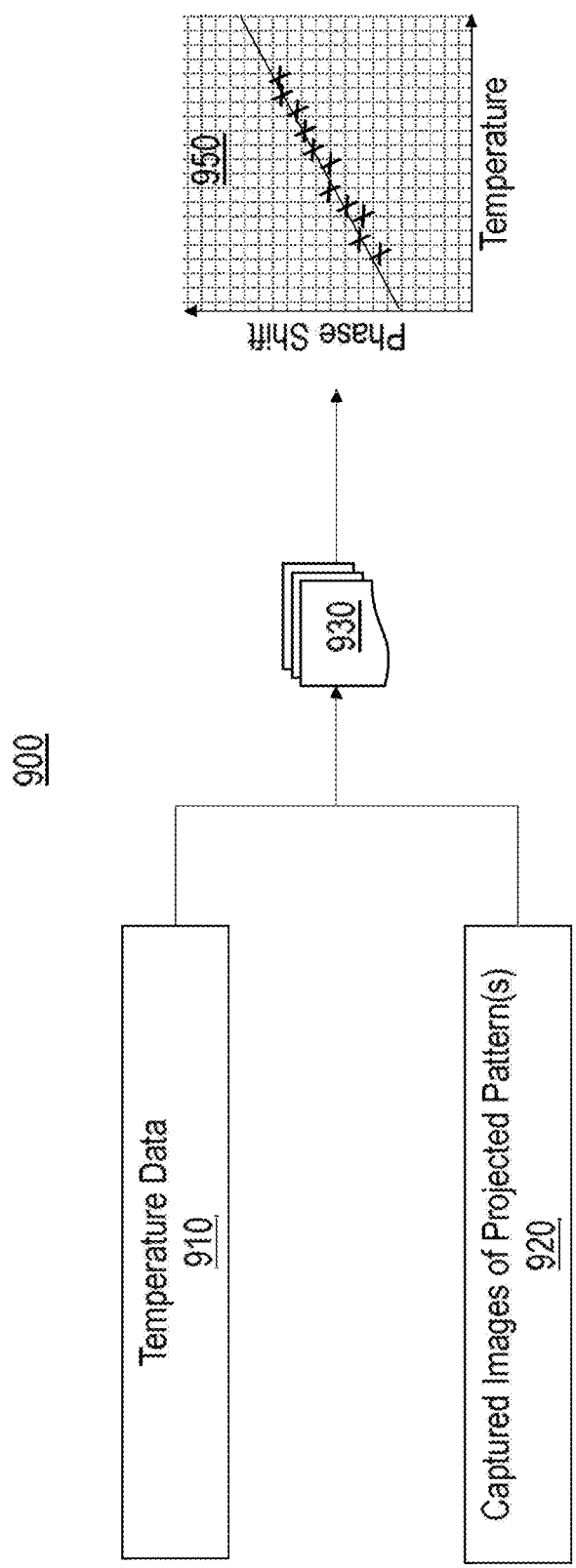
FIG. 9 illustrates an example machine learning network that may be used to learn the relationship between temperature and the phase shift of the bi-phase scanning mirror.

The process of collecting temperature data and image data repeats for a sufficient period of time (e.g., 20-25 minutes), so that sufficient datasets are gathered. The gathered data sets can then be fed into a machine learning network. FIG. 9 illustrates an example machine learning network 900. The temperature data 910, and captured image(s) of the projected pattern(s) (e.g., pattern(s) 810, 820) are fed into a linear regression model 930. For each set of the captured first pattern and second pattern, a corresponding phase shift may be determined. Based on the phase shift of each set of captured images 920 and the corresponding temperature 910, a linear relationship 950 between temperature and the phase shift can be obtained. Such a relationship 950 may then be stored at the storage 120 of the MEMS scanning device 100 as one of the temperature model(s) 122. The MEMS scanning device 100 can then use the temperature model(s) 122 to adjust its control signals or parameters Vr 142, Vg 144, Vb 146 to cause a proper phase of the laser projectors 148 to be synchronized with the phase of the MEMS mirror based on a current temperature.

Furthermore, as discussed above, the temperature characteristics of each MEMS scanning device 100 may change gradually during the lifetime of the device 100. Thus, the previously stored temperature model(s) may become out of date as time goes on. The principles described herein also address this issue by receiving feedback from the display observing camera 170, and updating the temperature model(s) based on the received feedback.

The process of updating the temperature model(s) is similar, but not exactly the same as the process of building the temperature model(s). When updating the temperature model(s), a current temperature is obtained by the thermometer, and one or more predetermined image pattern(s) are projected onto the display 160 based on the current temperature and the existing temperature models. The display observing camera 170 then captures image(s) of the projected pattern(s). Notably, when updating the temperature model(s), it is not necessary to obtain a large set of data across a full temperature range as that during model building. Instead, here, the captured image(s) are used to extract one or more features, and the extracted features are compared to one or more ideal feature(s). If the extracted feature(s) are substantially the same as the ideal feature(s), the existing temperature model(s) 122 are still fairly accurate. If the extracted feature(s) are not substantially the same as the ideal feature(s), the existing temperature model(s) 122 need to be adjusted accordingly.

In some embodiments, the predetermined pattern(s) are projected only at a small portion of the display 160, and the camera 170 is configured to observe only the small portion of the display, such that a smaller camera may be implemented, and also that the updating process would not significantly interfere with users' use of the device 100.

In some embodiments, the updating process may be triggered manually by users. In some embodiments, the updating process may be performed at a predetermined frequency (e.g., every 5 minutes, every day, every month, etc.). Depending on the result of an update, the device 100 may change the predetermined frequency to be higher or lower. For example, during an updating process, if there is no adjustment made (or the adjustment is less than a predetermined threshold), the device 100 may decrease the updating frequency; on the other hand, if there is a significant adjustment made (or the adjustment is greater than a predetermined threshold), the device 100 may increase the updating frequency.

Furthermore, the principles described herein are not only applicable to any MEMS scanning devices, but also applicable to any devices that include one or more MEMS scanning devices. For example, a single MEMS scanning device may be implemented in a stand-alone projector; alternatively, more than one MEMS scanning devices may be embedded in a single device (e.g., a head-mounted device).

Figure 10:
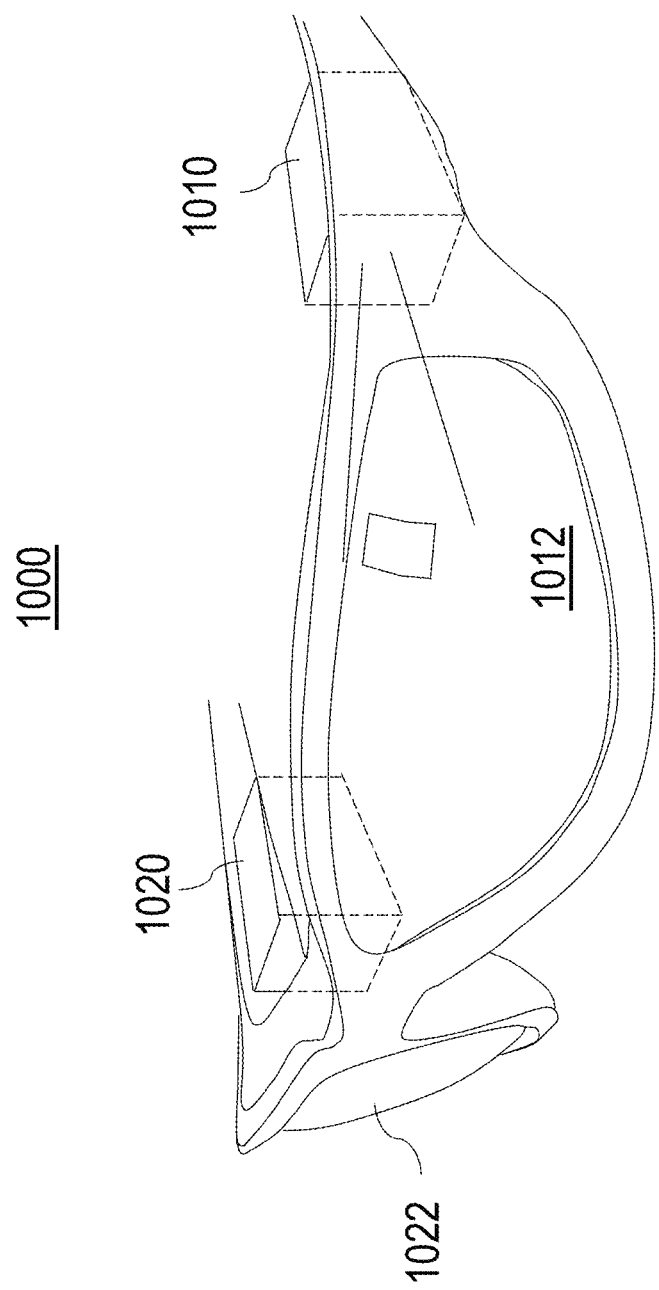
FIG. 10 illustrates an example head-mounted device that includes two MEMS scanning devices.

FIG. 10 illustrates an example head-mounted device 1000 that includes two MEMS scanning devices 1010 and 1020. Each of the MEMS scanning devices 1010 and 1020 is configured to project image(s) onto a corresponding display 1012 or 1022. Each of the devices 1010 and 1020 may correspond to the MEMS scanning device 100 of FIG. 1 and have its own temperature characteristics. As such, for each of the devices 1010 and 1020, a separate set of custom temperature model(s) may be built and stored at the head-mounted device 1000. Each of the MEMS scanning devices 1010 and 1020 not only can use its own set of temperature model(s) to adjust the control parameter(s) based on a current temperature, but also can update its own set of temperature model(s) during the lifetime of the head-mounted device 1000. In some embodiments, a shared storage device, processor, and/or thermometer may be used to store and update temperature model(s) for both devices 1010 and 1020. Alternatively, a separate storage, processor, and/or thermometer may be coupled and dedicated to each device 1010 or 1020.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
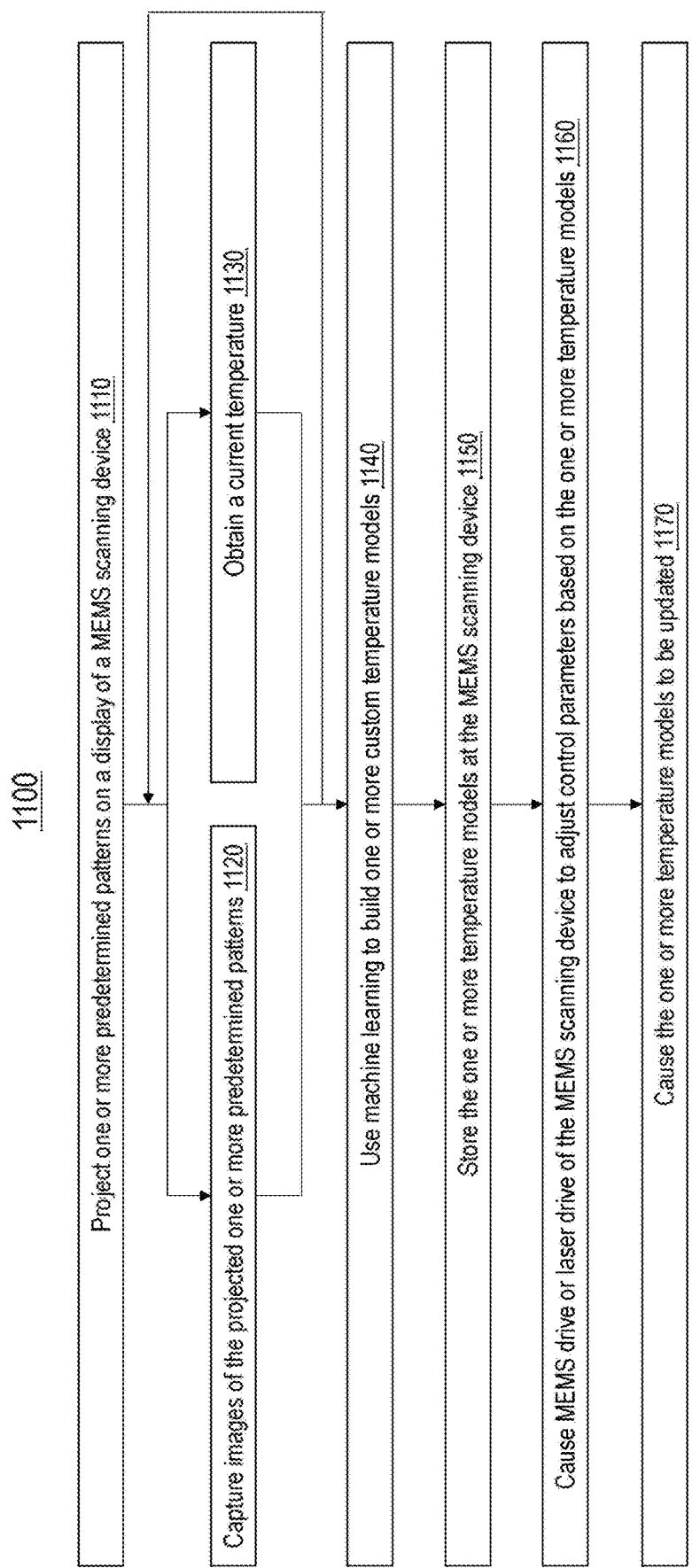
FIG. 11 illustrates a flowchart of an example method for building and/or updating one or more temperature model(s) of a MEMS scanning device.

FIG. 11 illustrates a flowchart of an example method 1100 for building and updating one or more temperature model(s) of a MEMS scanning device (e.g., a MEMS scanning device 100 of FIG. 1). In some embodiments, the method 1100 may be performed during the manufacturing process using an external camera and computing resources. In some embodiments, the method 1100 may be performed by the MEMS scanning device using its internal display observation camera (e.g., camera 170 of FIG. 1) and its internal processor 110.

The method 1100 includes projecting one or more predetermined pattern(s) on a display of the MEMS scanning device (1110). The displayed pattern(s) are then captured by a camera as one or more image(s) (1120). At the same time, a current temperature is obtained by a thermometer (e.g., thermometer 150 of FIG. 1) (1130). The acts of 1120 and 1130 may repeat multiple times, such that multiple sets of image(s) corresponding to different temperatures can be obtained. The obtained data sets are then fed into a machine learning network for building one or more temperature model(s) (1140).

The machine learning network may correspond to the machine learning network 600 of FIG. 6 and/or the machine learning network 900 of FIG. 9. The one or more temperature model(s) include (but are not limited to) models representing a relationship between temperature and at least one of (1) an amplitude of at least one of the MEMS scanning mirror, or (2) a phase shift of at least one of the MEMS scanning mirror. The temperature model(s) are then stored at the MEMS scanning device (1150) to cause a MEMS drive or a laser drive of the MEMS scanning device to adjust one or more control parameter(s) based on the stored one or more temperature model(s) (1160).

In some embodiments, the method 1100 may also include causing the one or more temperature model(s) to be updated (1170). In some embodiments, the updating the one or more temperature model(s) may be triggered manually by users. Alternatively, or in addition, the updating the one or more temperature model(s) may be performed automatically at a predetermined time interval.

Figure 12:
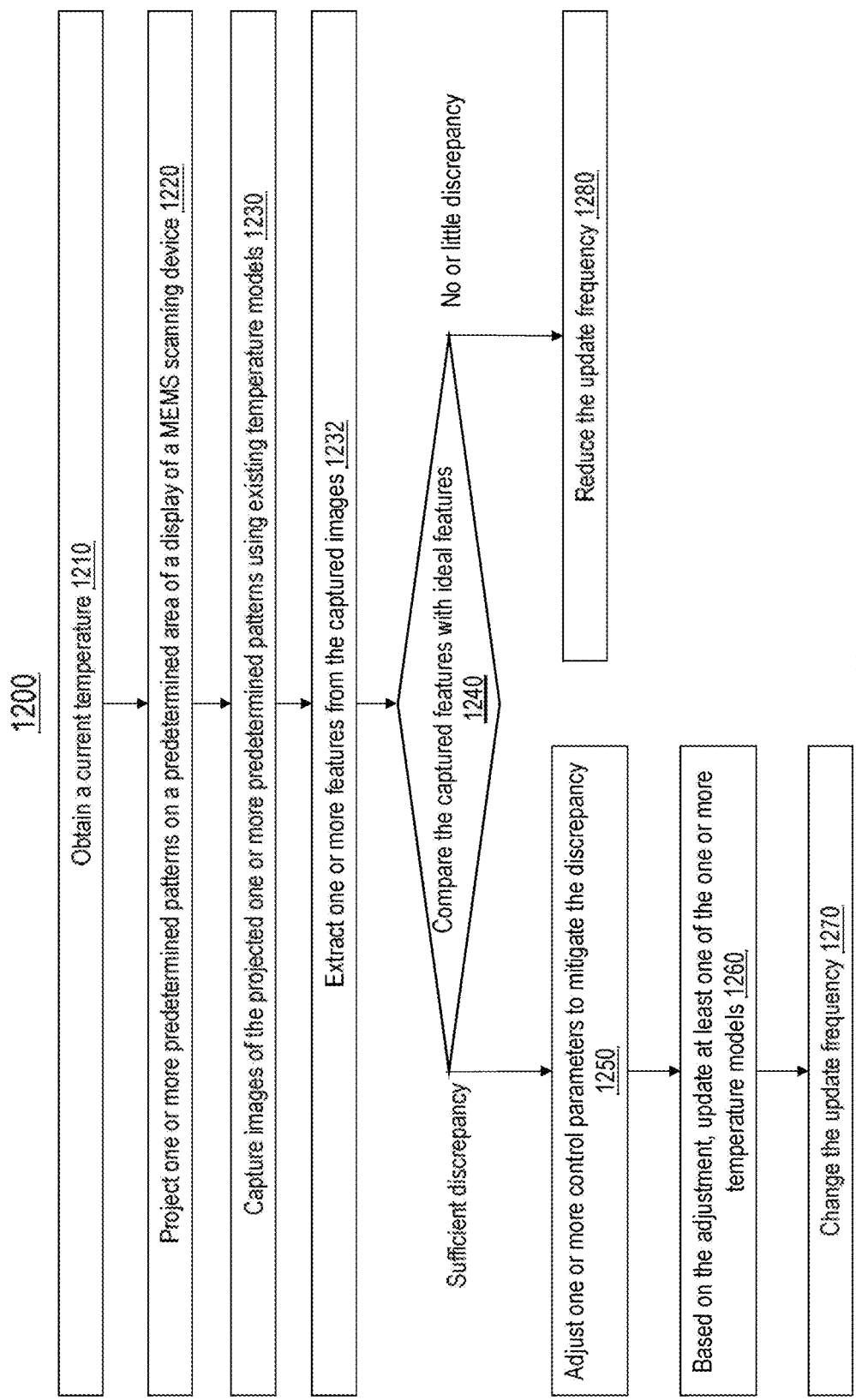
FIG. 12 illustrates a flowchart of an example method for updating one or more existing temperature model(s) of a MEMS scanning device.

FIG. 12 illustrates a flowchart of an example method 1200 for updating one or more existing temperature model(s) of a MEMS scanning device, which may correspond to the act 1170 of FIG. 11. The method 1200 is likely performed by the MEMS device itself using an internal display observing camera (e.g., camera 170 of FIG. 1). The method 1200 includes obtaining a current temperature (1210) and projecting one or more predetermined pattern(s) on a predetermined area of a display of the MEMS scanning device based on the current temperature and one or more temperature model(s) (1220). The internal display observing camera of the device is then used to capture one or more image(s) of the projected pattern(s) (1230). Next, one or more feature(s) are extracted from the captured one or more image(s) (1232). The one or more feature(s) may include (but not limited to) one or more dots or one or more lines.

The features extracted from the captured one or more image(s) are then compared with one or more ideal feature(s) to determine whether there is a sufficient discrepancy between the one or more feature(s) extracted from captured image(s) and the ideal feature(s) (1240). If there is sufficient discrepancy, one or more control parameter(s) are adjusted to mitigate the discrepancy (1250). The one or more parameters include (but are not limited to) an amplitude of one of the MEMS scanning mirror(s) and/or a phase shift of the laser projector. Based on the adjustment(s) of the control parameter(s), at least one of the one or more temperature model(s) are adjusted (1260).

In some embodiments, when the adjustment is greater than a predetermined threshold, time interval for updating the temperature model(s) is decreased or the frequency is increased; on the other hand, when the adjustment is smaller than a predetermined threshold, the time interval for updating the temperature model(s) is increased, or the frequency is decreased (1270). Similarly, when there is not sufficient discrepancy between the feature(s) extracted from the captured image(s) and the ideal feature(s), the time interval for updating the temperature model(s) may also be increased or the frequency is decreased (1280)

Finally, because the principles described herein may be performed in the context of a computing system (for example, the MEMS scanning device itself is a computing system, and building temperature model(s) via machine learning may be performed by an external computing system), some introductory discussion of a computing system will be described with respect to FIG. 13.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
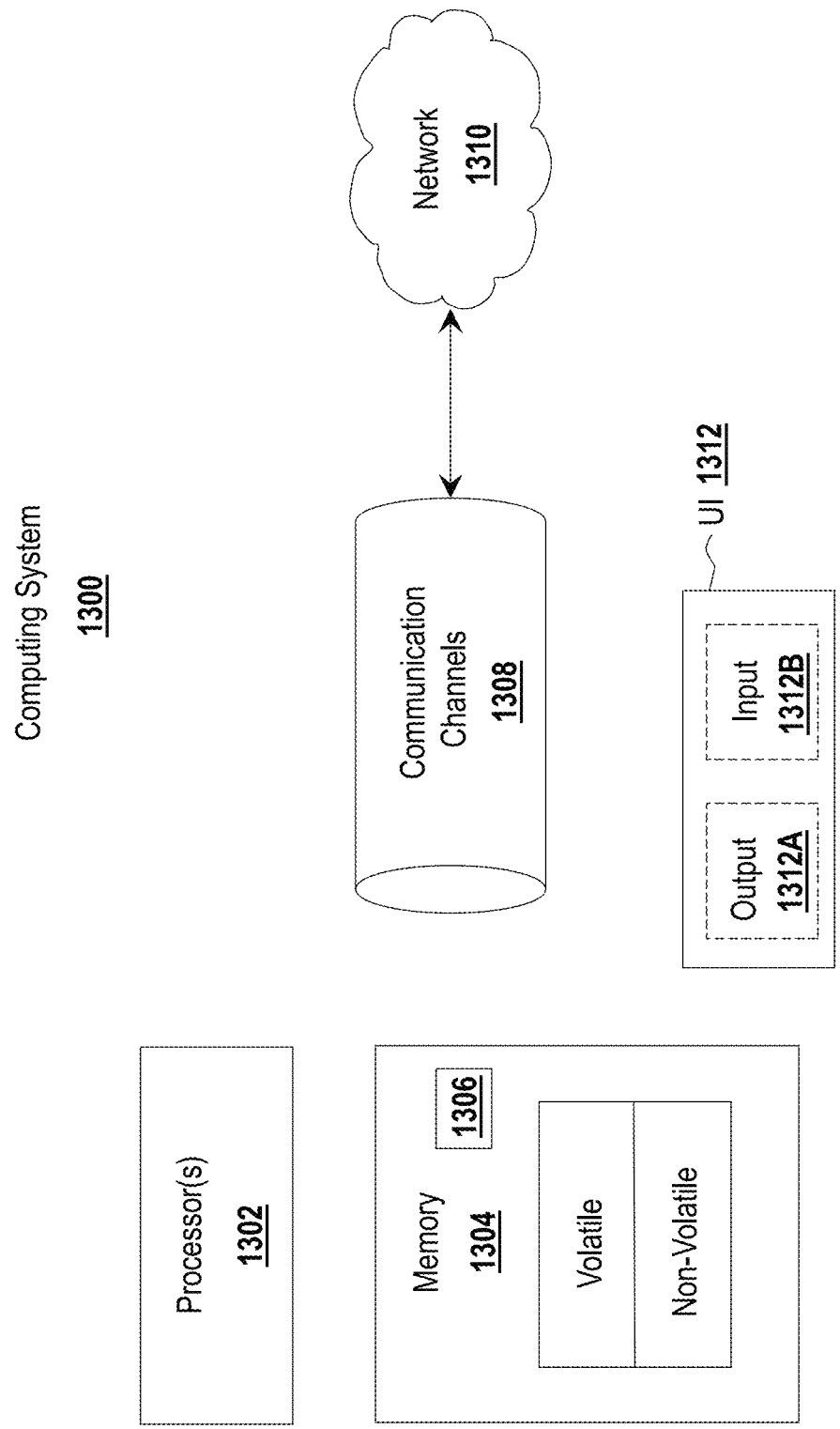
FIG. 13 illustrates an example computing system in which the principles described herein may be employed.

As illustrated in FIG. 13, in its most basic configuration, a computing system 1300 typically includes at least one hardware processing unit 1302 and memory 1304. The processing unit 1302 may include a general-purpose processor and may also include a field-programmable gate array (FPGA), an application-specific integrated circuit (ASIC), or any other specialized circuit. The memory 1304 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1300 also has thereon multiple structures often referred to as an "executable component". For instance, memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface system 1312 for use in interfacing with a user. The user interface system 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, holograms and so forth. Examples of input mechanisms 1312B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1300 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1302 and memory 1304, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for building a model that reflects a relationship between a temperature characteristic of a micro-electromechanical system (MEMS) scanning device and an operational characteristic of the MEMS scanning device, said method comprising:
   causing one or more laser units and the MEMS scanning device to project a predetermined pattern, wherein the predetermined pattern has multiple lines in a scanning direction of the MEMS scanning device;
   while the predetermined pattern is being projected, monitoring a temperature of the MEMS scanning device, such that temperature data is generated;
   while the predetermined pattern is being projected, obtaining images of the predetermined pattern, such that image data is generated, wherein:
      the image data provides indications of how the predetermined pattern changes over time based on fluctuations in the temperature of the MEMS scanning device,
      the indications are reflective of the operational characteristic of the MEMS scanning device,
      the operational characteristic is one of an amplitude for at least one MEMS scanning mirror or a phase shift for the at least one MEMS scanning mirror, and
      the predetermined pattern is different depending on which one of the amplitude or the phase shift is being monitored; and
   feeding the temperature data and the image data into a model that determines a relationship between the temperature of the MEMS scanning device and the operational characteristic of the MEMS scanning device.

2. The method of claim 1, wherein the scanning direction of the MEMS scanning device is one of a vertical scanning direction or a horizontal scanning direction.

3. The method of claim 1, wherein the method further includes using the model to cause the MEMS scanning device to adjust a control signal of the MEMS scanning device.

4. The method of claim 1, wherein the method further includes using the model to cause the MEMS scanning device to adjust a parameter of the MEMS scanning device.

5. The method of claim 1, wherein a deflection angle of the MEMS scanning device reduces when the temperature increases.

6. The method of claim 1, wherein the model is a machine learning model.

7. The method of claim 1, wherein (i) the temperature is monitored and (ii) the images are obtained for a period of time spanning between 20-25 minutes.

8. The method of claim 1, wherein a thermometer is used to monitor the temperature of the MEMS scanning device, and wherein the thermometer is installed next to one or more mirrors of the MEMS scanning device.

9. The method of claim 1, wherein a thermometer is used to monitor the temperature of the MEMS scanning device, and wherein the thermometer is installed in a housing where the MEMS scanning device is also installed.

10. The method of claim 1, wherein the operational characteristic is the amplitude for the at least one MEMS scanning mirror.

11. The method of claim 1, wherein the operational characteristic is the phase shift for the at least one MEMS scanning mirror.

12. A computer system that builds model that reflects a relationship between a temperature characteristic of a microelectromechanical system (MEMS) scanning device and an operational characteristic of the MEMS scanning device, said computer system comprising:
  one or more processors; and
  one or more computer-readable hardware storage devices that store instructions that are executable by the one or more processors to cause the computer system to:
    cause one or more laser units and the MEMS scanning device to project a predetermined pattern, wherein the predetermined pattern has multiple lines in a scanning direction of the MEMS scanning device;
    while the predetermined pattern is being projected, monitor a temperature of the MEMS scanning device, such that temperature data is generated;
    while the predetermined pattern is being projected, obtain images of the predetermined pattern, such that image data is generated, wherein:
      the image data provides indications of how the predetermined pattern changes over time based on fluctuations in the temperature of the MEMS scanning device,
      the indications are reflective of the operational characteristic of the MEMS scanning device,
      the operational characteristic is one of an amplitude for at least one MEMS scanning mirror or a phase shift for the at least one MEMS scanning mirror, and
      the predetermined pattern is different depending on which one of the amplitude or the phase shift is being monitored; and
    feed the temperature data and the image data into a model that determines a relationship between the temperature of the MEMS scanning device and the operational characteristic of the MEMS scanning device.

13. The computer system of claim 12, wherein the temperature is monitored and the images are obtained at a predetermined frequency.

14. The computer system of claim 12, wherein the images are obtained in response to a condition where the temperature has changed a threshold amount.

15. The computer system of claim 12, wherein the model is subsequently updated.

16. A method for building a model that reflects a relationship between a temperature characteristic of a microelectromechanical system (MEMS) scanning device and an operational characteristic of the MEMS scanning device, said method comprising:
  causing one or more laser units and the MEMS scanning device to project a predetermined pattern, wherein the predetermined pattern has multiple lines in a scanning direction of the MEMS scanning device;
  while the predetermined pattern is being projected, monitoring a temperature of the MEMS scanning device, such that temperature data is generated;
  while the predetermined pattern is being projected, obtaining images of the predetermined pattern, such that image data is generated, wherein:
    the image data provides indications of how the predetermined pattern changes over time based on fluctuations in the temperature of the MEMS scanning device,
    the indications are reflective of the operational characteristic of the MEMS scanning device,
    the operational characteristic is one or more of an amplitude for at least one MEMS scanning mirror or a phase shift for the at least one MEMS scanning mirror, and
    the predetermined pattern is different depending on which one of the amplitude or the phase shift is being monitored; and
  feeding the temperature data and the image data into a model that determines a relationship between the temperature of the MEMS scanning device and the operational characteristic of the MEMS scanning device, wherein the model is a machine learning model.

17. The method of claim 16, wherein a machine learning model is subsequently updated.

18. The method of claim 16, wherein the method further includes using the model to cause the MEMS scanning device to adjust one or more of a control signal or a parameter of the MEMS scanning device.

19. The method of claim 16, wherein a deflection angle of the MEMS scanning device reduces when the temperature increases.

20. The method of claim 16, wherein the images are obtained for a period of time spanning between 20-25 minutes.

* * * * *